(12) United States Patent
Hobden et al.

(10) Patent No.: US 11,957,969 B1
(45) Date of Patent: Apr. 16, 2024

(54) SYSTEM AND METHOD FOR MATCH DATA ANALYTICS

(71) Applicant: Gotta Sports Inc., Naples, FL (US)

(72) Inventors: Brett Ronald Hobden, Naples, FL (US); Gordon Alexander Uehling, III, Alpine, NJ (US)

(73) Assignee: Gotta Sports Inc., Naples, FL (US)

( * ) Notice: Subject to any disclaimer, the term of this patent is extended or adjusted under 35 U.S.C. 154(b) by 0 days.

(21) Appl. No.: 18/364,304

(22) Filed: Aug. 2, 2023

(51) Int. Cl.
*A63B 71/06* (2006.01)
*A63B 24/00* (2006.01)
*A63B 102/02* (2015.01)

(52) U.S. Cl.
CPC ...... *A63B 71/0669* (2013.01); *A63B 24/0021* (2013.01); *A63B 2024/0025* (2013.01); *A63B 2024/0034* (2013.01); *A63B 2024/0056* (2013.01); *A63B 2102/02* (2015.10); *A63B 2220/10* (2013.01); *A63B 2220/806* (2013.01)

(58) Field of Classification Search
CPC ............ A63B 71/0669; A63B 24/0021; A63B 2102/02; A63B 2024/0025; A63B 2024/0034; A63B 2024/0056; A63B 2220/10; A63B 2220/806
See application file for complete search history.

(56) References Cited

U.S. PATENT DOCUMENTS

| | | | |
|---|---|---|---|
| 2013/0053190 A1* | 2/2013 | Mettler | A63B 24/0062 473/422 |
| 2017/0061817 A1* | 3/2017 | Mettler May | A61B 5/1124 |
| 2017/0232324 A1* | 8/2017 | Mettler May | G06F 18/00 473/459 |
| 2019/0009133 A1* | 1/2019 | Mettler May | G09B 19/0038 |
| 2022/0198368 A1* | 6/2022 | May | G06Q 10/063118 |

* cited by examiner

*Primary Examiner* — Malina D. Blaise
(74) *Attorney, Agent, or Firm* — Foley & Lardner LLP

(57) ABSTRACT

Described herein are systems and methods for racket sports match analytics using data recorded through an image processing system or a data capture system. The data is then used to determine ball parameters and position data of a player. The data is then analyzed to assign tags to shots and provide an interface via which the shot can be displayed in a video player.

20 Claims, 13 Drawing Sheets

SYSTEM AND METHOD FOR MATCH DATA ANALYTICS

BACKGROUND

In the sport of tennis, which attracts millions of viewers worldwide, the need to capture and display data to gain insights into player performance and tendencies is growing. However, existing technological solutions, provide little value to the players as the analysis lacks depth or granularity. Other racket sports, such as badminton, squash, pickleball, table tennis, and others, have a similar need for more analytics.

SUMMARY

At least one aspect of the present disclosure is directed to a system for match analytics, including various sports like tennis, badminton, squash, and others. At least one aspect of the present disclosure is directed to a system for tennis match analytics. The system may include one or more processors. The one or more processors may access a recording of a tennis match played on a tennis court between a first player and a second player. The recording is captured by a data capture system. The recording can be a video recording captured by at least one camera. The recording can also be a recording of data points captured by one or more sensors. The one or more processors may use the recording to determine a first position of the first player at a first time corresponding to when the second player hit a first shot. The one or more processors may also determine a second position of the first player at a second time corresponding to when the first player hits a second shot in response to the first shot. The one or more processors may determine, for the first shot, a zone of a plurality of zones of the court based on the second player position of the first player. Each zone of the plurality of zones may correspond to a predetermined distance from at least one landmark of the tennis court. The one or more processors may use the recording to determine a first set of ball parameters responsive to the second player hitting a ball and prior to the ball being hit by the first player. The one or more processors may determine a shot difficulty metric of the first shot based on the zone, the first position, and the first set of ball parameters. The one or more processors may store an association between the shot difficulty metric, the zone, the first position, and the first set of ball parameters in one or more data structures. The one or more processors may determine a shot classification of the second shot hit by the first player in response to the first shot. The shot classification can be determined based on a second set of ball parameters corresponding to the second shot and the shot difficulty metric of the first shot. The second set of ball parameters can include a speed of the ball, a trajectory of the ball (which can include a direction and distance travelled by the ball), an amount of spin, and an estimated height of the ball above the net. Upon receiving a request for shot classification, the one or more processors may provide a graphical user interface that displays a computer-generated tennis court with the plurality of zones and an indicator indicating the second position of the first player using data stored in the one or more data structures. The indicator can include an actionable object.

In some embodiments, the one or more processors may present a second graphical user interface including a video player to present a video clip corresponding to the second shot. In some embodiments, the one or more processors may present a second graphical user interface including a video player to present a video clip of the first point.

In some embodiments, the one or more processors may update the one or more data structures to store an association between the first point, the shot classification of the first shot and the shot classification of the second shot.

In some embodiments, the one or more processors may determine a contact time at which the second player hit the first shot. Based on the time when the second player hits the first shot, the one or more processors may determine the first position of the first player at the same contact time.

In some embodiments, the one or more processors may select a subset of frames of the plurality of frames included in the video recording. From a first frame of the subset of frames, the one or more processors may identify the first position of the first player responsive to inputting the first frame through a model trained to detect objects. The first frame may correspond to the contact time at which the second player hit the first shot. Similarly, from a second frame of the subset of frames, the one or more processors may identify the second position of the first player when the first player hits the second shot by inputting the second frame through the model.

The plurality of zones can include five distinct zones: the first zone that extends from the net to a first distance, the second zone that spans from the first edge of the first zone to a second distance greater than the first distance, the third zone that extends from the second edge of the second zone to a third distance greater than the second distance, the fourth zone that extends from the third edge of the third zone to a fourth distance greater than the third distance, and the fifth zone that extends from the fourth edge of the fourth zone to a fifth distance greater than the fourth distance. In some embodiments, to determine the zone of the court to which the second position of the first player corresponds, the one or more processors may select the zone from the plurality of zones based on coordinates corresponding to the second position.

In some embodiments, the one or more processors may determine a shot category of the second shot responsive to determining a shot family. The shot family may correspond to shot type and spin. In some embodiments, the one or more processors may generate an analysis report analyzing a plurality of points including the first point based on respective shot categories of shots hit by the first player. In some embodiments, the one or more processors may determine a shot category of the second shot based on the second set of ball parameters.

In some embodiments, the one or more processors may use the recording to determine a third position of the first player at a third time corresponding to when the second player hit a third shot, and a fourth position of the first player at a fourth time corresponding to when the first player hits a fourth shot in response to the third shot. In some embodiments, the one or more processors may determine, for the third shot, a respective zone of the plurality of zones of the court based on the fourth player position of the first player. In some embodiments, the one or more processors may use the recording to determine a third set of ball parameters responsive to the second player hitting the ball and prior to the ball being hit by the first player in the second point. In some embodiments, the one or more processors may determine a second shot difficulty metric of the third shot based on the zone, the third position, and the third set of ball parameters. In some embodiments, the one or more processors may store, in one or more data structures, an association between the second shot difficulty metric, the respective zone, the third position, and the third set of ball parameters. In some embodiments, the one or more processors may determine a respective shot classification of the fourth shot hit by the first player in response to the third shot. The shot classification can be determined based on a fourth set of ball parameters corresponding to the fourth shot and the second shot difficulty metric of the third shot. Upon receiving a request for shot classification of the fourth shot, the one or more processors may provide a graphical user interface that displays a computer-generated tennis court with the plurality of zones and an indicator indicating the fourth position of the first player using data stored in the one or more data structures.

In some embodiments, the one or more processors may provide a diamond on the tennis court. Further, an area included in the diamond is a first area based on a first selectable object and the area of the diamond is a second area based on a second selectable object. In some embodiments, the one or more processors may provide a rectangle within each service box of the tennis court. Further, a width of the rectangle is a first width based on a first selectable object and the width of the rectangle is a second width based on a second selectable object.

In some embodiments, an application executing on the client device is configured to present a plurality of graphical user interfaces including a representation of a tennis court with a plurality of vertical lines extending from a net of the tennis court towards a baseline of the tennis court, the plurality of vertical lines including a first vertical line extending through the center service line, a second vertical line and a third vertical line extending through a center of a respective service box of the tennis court and a fourth vertical line and a fifth vertical line extending through a respective singles sideline of the tennis court, and wherein the graphical user interface provides an actionable object configured to either display the plurality of vertical lines or restrict the display of the vertical lines.

In some embodiments, the one or more processors may provide a graphical user interface with a plurality of selectable objects. The selection of a first subset of the plurality of selectable objects includes presenting a first subset of the plurality of indicators on the tennis court. Further, the selection of a second subset of the plurality of selectable objects includes presenting a second subset of the plurality of indicators on the tennis court. In some embodiments, the one or more processors may provide generate a report of the second player based on different sequence of events.

In some embodiments, the one or more processors may automatically identify strengths and weaknesses and classify them based on different sequence of events. In some embodiments, the one or more processors may cause presentation of graphical user interface displaying performance analysis.

At least one aspect of the present disclosure is directed to a method of tennis match analytics. One or more processors may access a recording of a tennis match played on a tennis court between a first player and a second player. The recording is captured by a data capture system. The one or more processors may use the recording to determine a first position of the first player at a first time corresponding to when the second player hit a first shot. The one or more processors may also determine a second position of the first player at a second time corresponding to when the first player hits a second shot in response to the first shot. The one or more processors may determine, for the first shot, a zone of a plurality of zones of the court based on the second player position of the first player. Each zone of the plurality of zones may correspond to a predetermined distance from at least one landmark of the tennis court. The one or more processors may use the recording to determine a first set of ball parameters responsive to the second player hitting a ball and prior to the ball being hit by the first player. The one or more processors may determine a shot difficulty metric of the first shot based on the zone, the first position, and the first set of ball parameters. The one or more processors may store an association between the shot difficulty metric, the zone, the first position, and the first set of ball parameters in one or more data structures. The one or more processors may determine a shot classification of the second shot hit by the first player in response to the first shot. The shot classification can be determined based on a second set of ball parameters corresponding to the second shot and the shot difficulty metric of the first shot. Upon receiving a request for shot classification, the one or more processors may provide a graphical user interface that displays a computer-generated tennis court with the plurality of zones and an indicator indicating the second position of the first player using data stored in the one or more data structures.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Following below are more detailed descriptions of various concepts related to, and embodiments of, the system for tennis match analytics. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

For purposes of reading the description of the various embodiments below, the following descriptions of the sections of the specification and their respective contents may be helpful:

Section A describes embodiments of systems and methods for analyzing a tennis match;

Section B describes embodiments of systems and methods for conducting benchmark analysis;

Section C describes embodiments of systems and methods for identifying shot types based on ball parameters;

Section D describes embodiments of systems and methods for determining both forced and unforced errors using machine learning;

Section E describes embodiments of systems and methods for automatically tagging shots using computer vision and machine learning;

Section F describes embodiments of systems and methods for analyzing a point based on zone/shot type/mode combination using computer vision;

Section G describes embodiments of systems and methods for identifying player weaknesses based on zone/shot type combination;

Section H describes embodiments of systems and methods for categorizing and presenting video snippets of points based on zone/shot type combination;

Section I describes embodiments of systems and methods for goal setting;

Section J describes embodiments of systems and methods for scouting;

Section K describes embodiments of systems and methods for generating a highlight reel for a player based on zone/shot type combination;

Section L describes embodiments of systems and methods for facilitating a universal language, situationally specific methodology, and framework for analyzing, viewing, and learning the modern game; and Section M describes a network environment and computing environment which may be useful for practicing embodiments described herein.

Figure 1A:
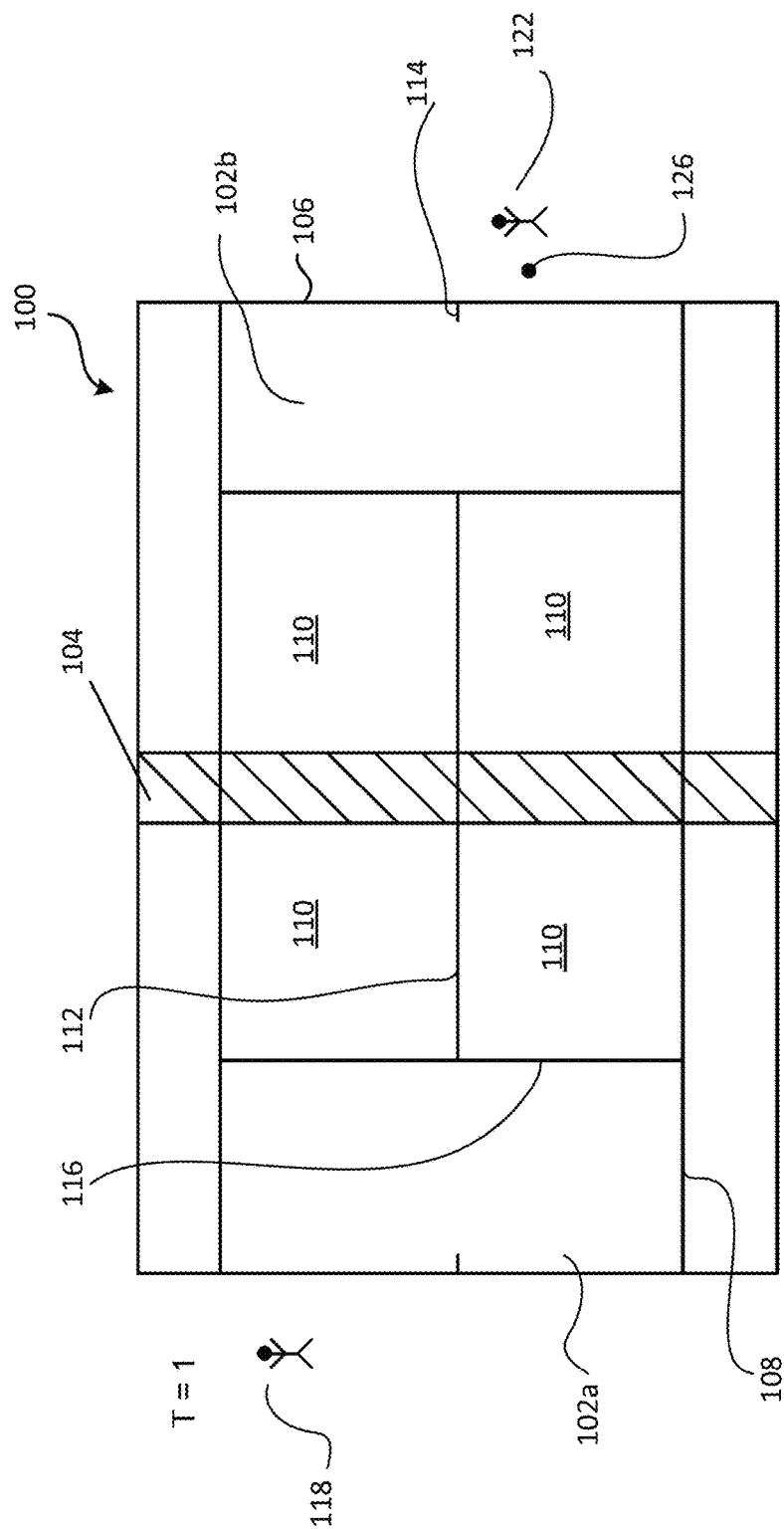
FIG. 1A depicts a simplified top view of a tennis court, displaying the respective positions of the players at a first time in accordance with an illustrative embodiment.
Figure 1B:
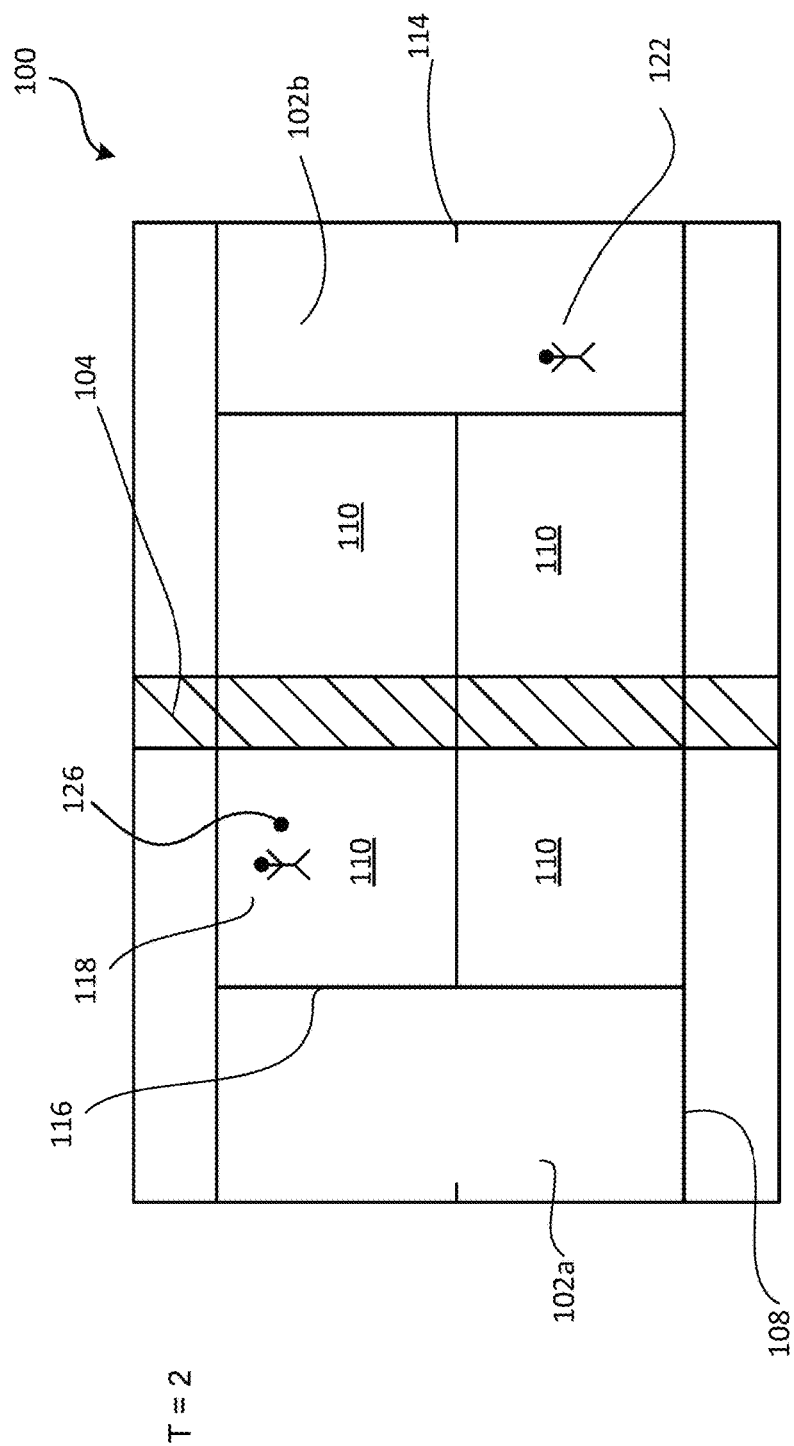
FIG. 1B depicts a simplified perspective view of a tennis court, displaying the respective positions of the players at a second time in accordance with an illustrative embodiment.

Referring now to FIGS. 1A and 1B, which depict a graphical representation of a tennis court 100 at two different points in time, specifically at a first time and a second time, respectively. The tennis court 100 includes a first side 102a and a second side 102b separated by a net 104. Each of the first side 102a and the second side 102b has a corresponding baseline 106, sideline 108, and two service boxes 110 having a common center service line 112. A center mark 114 divides the baseline 106 in half and extends along the same axis as the center service line 112.

As shown in FIG. 1A, a first player 118 is at a first position 120 on the first side 102a of the tennis court 100 and a second player 122 is at a second position 124 on the second side 102b of the tennis court 100. At the first time (shown in FIG. 1A), the second player 122 hits a ball 126, which corresponds to a first shot. Similarly, at the second time (as shown in FIG. 1B), the first player 118 traverses a distance on the tennis court 100 to hit the ball 126, which corresponds to a second shot hit in response to the first shot hit by the second player 122.

A. Systems and Methods for Analyzing a Tennis Match

Traditional computer-based tennis analytics tools have provided a rudimentary understanding of game dynamics, performance evaluation, and strategic patterns. However, these tools often lack depth, failing to capture information that players can use to improve their game.

The present application provides a granular approach to capture and display tennis match data. The application is designed to give players greater insights into their own and their opponents' performance and tendencies during different situations to gain any possible edge over their opponents. By providing players with more detailed and valuable information about their performance, the present application aims to help players analyze, understand, and improve their game.

Figure 2:
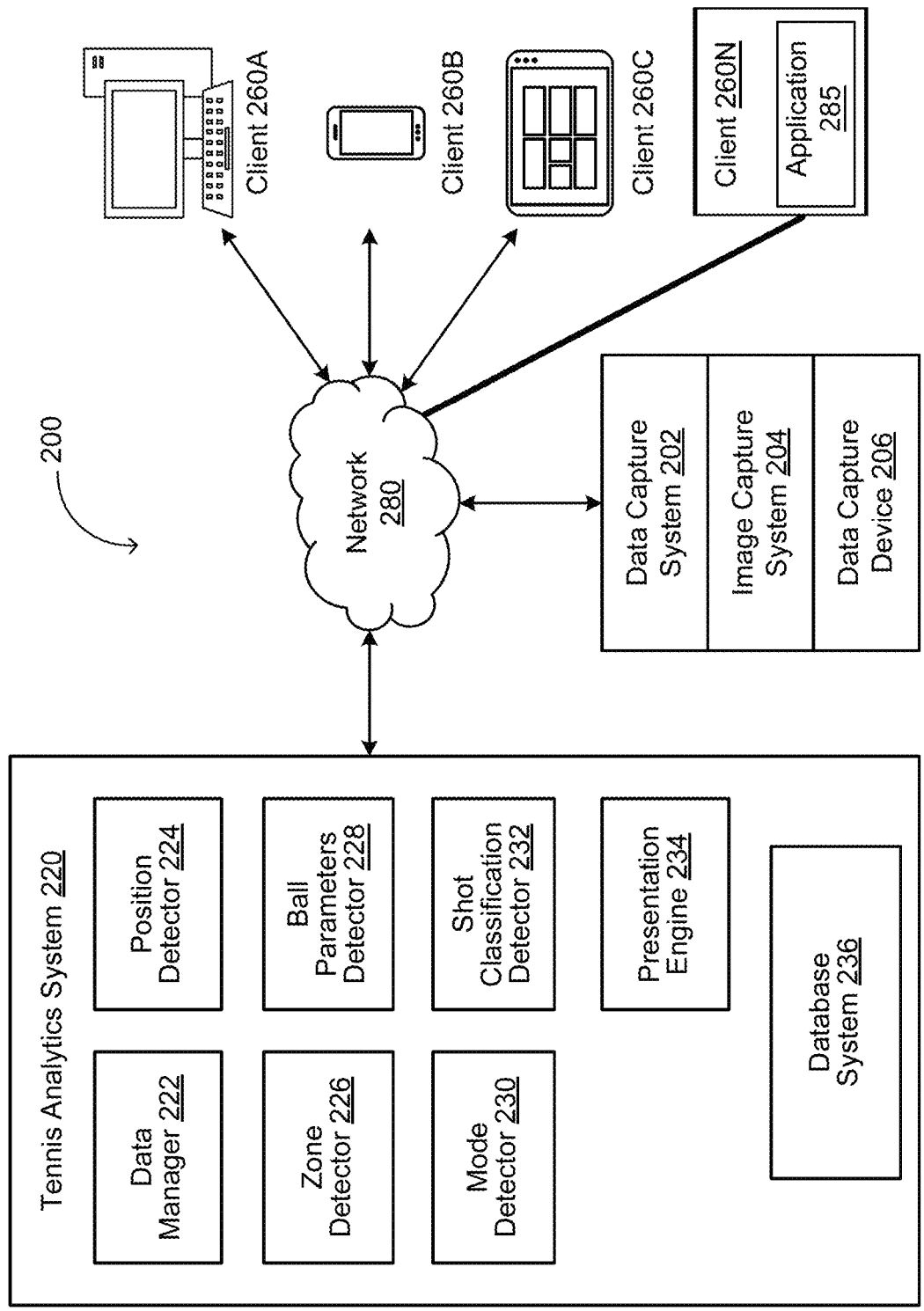
FIG. 2 depicts a block diagram of a system for capturing and analyzing data related to a tennis match in accordance with an illustrative embodiment.

Referring now to FIG. 2, which depicts a block diagram of an environment 200 for capturing and analyzing data related to a tennis match. As a brief overview, the environment 200 can include at least one data capture system 202, at least one tennis analytics system 220 and, one or more client devices 260A-N (hereinafter generally referred to as client device 260), and, among others. The data capture system 202, the tennis analytics system 220, and the client device 260 may be communicatively coupled with one another via at least one network 280. The data capture system 202 can be one or more devices communicatively coupled together to capture data regarding tennis matches. The data can include video or images of the tennis match or sensor data relating to the players or the balls used in the tennis match. The data capture system 202 can include one or more image capture devices 204, one or more data capture devices 206, and a data structure 208 for storing data relating to data captured by the image capture devices 204 or the data capture devices 206.

The image capture device 204 of the data capture system 202 can include camera for capturing a video or images of a tennis match. The image capture device 204 can be mounted at specific positions around the tennis court to capture a video of the tennis match from a particular perspective. In some embodiments, the image capture device 204 can be configured to move and capture the video from various different perspectives.

In some embodiments, the data capture devices 206 of the data capture system 202 are configured to capture sensor data relating to a tennis match. For example, the data capture devices 206 can include sensors that are configured to collect data about the tennis players, the ball, or other aspects of the tennis match and transmit the collected data to the data capture system 202. In some embodiments, the sensors may be placed on the tennis court 100, the racquets, the balls, or on various wearable items, such as smart watches or clothing. The sensors can be configured to capture information relating to the position and movement of each of the players and one or more parameters of the ball 126 during each point of the tennis match. Additional details relating to the position and movement of each of the players and the one or more parameters of the ball 126 are provided herein.

The data capture system 202 can store the captured data in the one or more data structures 208. For instance, the data capture system 202 can store the video data or images from the video data captured by the image capture devices 204 in the one or more data structures 208. Similarly, the data capture system 202 can store the data captured by the data capture devices 206 in the one or more data structures 208. The data capture system 202 can transmit or share the data stored in the one or more data structures 208 with the tennis analytics system 220.

The tennis analytics system 220 can include at least one data manager 222, at least one position detector 224, at least one zone detector 226, at least one ball parameters detector 228, at least one mode detector 230, at least one shot-classification detector 232, at least one presentation engine 234, and at least one database 236, among others.

The data manager 222 can be any script, file, program, application, set of instructions, or computer-executable code that is configured to enable a computing device on which the data manager 222 is executed to perform one or more functions of the data manager 222 described herein. The data manager 222 is configured to access the data stored in the one or more data structures 208 of the data capture system 202. The data manager 222 can access the data via the network 280. The data manager 222 can be configured to download, reproduce, or otherwise store the data captured by the data capture system 202 in the database 236. The data manager 222 is configured to store the data in a structured format to facilitate efficient retrieval and analysis.

The position detector 224 of the tennis analytics system 220 can be any script, file, program, application, set of instructions, or computer-executable code that is configured to enable a computing device on which the position detector 224 is executed to perform one or more functions of the position detector 224 described herein. The position detector 224 is configured to determine the position of the players on the tennis court.

In some embodiments, the position detector 224 is configured to determine the position of each player from an image frame. The position detector can determine the position of each player on each frame using an object detection model 225 that is configured to identify one or more of the players within each image frame. The object detection model 225 can be configured to identify pixel coordinates on the image frame that correspond to each of the players. In some embodiments, the object detection model 225 can identify a racquet of a player and use the racquet as a proxy for the player, which can then be used to determine the position of the player. The position detector 224 can determine, for each player, from the pixel coordinates corresponding to that player and pixel coordinates of other objects or landmarks of the tennis court, a position of the player relative to the tennis court 100. Examples of landmarks can include the net 104, any of the lines of the tennis court 100, or other objects that may provide a frame of reference. In some embodiments, the position detector 224 can maintain, for an image frame, a list of pixel coordinates that each corresponds to a respective landmark (for example, baseline 106, sideline 108, net 104, etc.) of the tennis court 100. The position detector 224 can, for each image frame, determine the pixel coordinates corresponding to a player shown in the image frame, and compare the pixel coordinates corresponding to the player with the list of pixel coordinates to determine the position of the player with respect to the tennis court 100.

B. Systems and Methods for Conducting Benchmark Analysis

The systems and methods described herein can be implemented to provide a benchmark analysis that a player can use to improve their performance. For instance, the benchmark analysis can provide the player analytics on various aspects of their game depending on whether the analysis is done on video footage of a practice session or of a match. In some embodiments, the benchmark analysis can be performed using data from a plurality of matches. By way of the present disclosure, the systems and methods described herein, players can measure their performance against specific benchmarks, set realistic goals, and track their progress over time. For example, a player may be able to determine the amount of variation they have in their serves relative to previous matches of the player or relative to other players. Other examples of benchmark analytics can include the ratio of forehands to backhands the player hits, the ratio of errors to winners, and so forth. Leveraging the shot classification and tagging services of the systems described herein, a player can obtain benchmarks across a large variety of shot types, shot classifications, zones, runways, among others.

Continuing with the specific components of the tennis analytics system 220, in some embodiments, the position detector 224 can determine the position of a player across a plurality of image frames corresponding to a video recording of a tennis match. By doing so, the position detector 224 can track a player's movement across the court over time as described below.

The position detector 224 can maintain a data structure in the database 236. The data structure can store an association between a player ID identifying a player, a timestamp corresponding to a time of the tennis match, a player's pixel coordinates corresponding to where the player appears on an image, and a player position corresponding to the player's position on the tennis court 100. Each time the position detector 224 analyzes an image frame, it can update the data structure to add an entry corresponding to the player's position from the image frame. As the position detector 224 processes a sequence of images over time, the position detector 224 can update the data structure and use the data structure to track the player's movement on the tennis court 100 during the course of the tennis match.

Below is an example of a data structure generated for a given match between Player 1 and Player 2, where the position detector is configured to generate an entry corresponding to each time a player hits a shot. It should be appreciated that the tennis analytics system 220 can be configured to generate additional entries even while players are not hitting shots (for example, every second, every 50 ms, etc.) and therefore, can generate entries throughout the match to track the players positions over time.

| Timestamp | Player 1 (P1) Pos. | Player 2 (P2) Pos. | Shot hit by? |
|---|---|---|---|
| 00:00:02 | X1, Y1 | X2, Y2 | P2 |
| 00:00:07 | X3, Y3 | X4, Y4 | P1 |
| 00:00:18 | X5, Y5 | X6, Y6 | P2 |
| . . . | . . . | . . . | . . . |
| nn:nn:nn | XN, YN | XN', YN' | P' |

The position detector 224 can also be configured to determine positions of the ball 126 relative to the tennis court 100. The position detector 224 can rely on images or video data or sensor data from a sensor mounted on or inside the ball 126 to determine the position of the ball 126 relative to the tennis court 100. The position detector 224 can determine the position of the ball 126 using images or video data by using an object detection model 225 to detect the ball 126 from the images or video data and determining the position of the ball 126 relative to the tennis court 100 by comparing the ball's pixel coordinates with pixel coordinates of other objects of the tennis court 100 shown in the images or video frames. To determine the position of the ball 126 using sensor data of the ball 126, the position detector 224 can create a mapping of the tennis court 100 and use the sensor data to determine the position of the ball 126 relative to the tennis court 100 based on the mapping.

It should be appreciated that the object detection model 225 used for analyzing image frames of a tennis match to determine the positions of players and a ball 126 on a tennis court can include deep learning-based approaches such as SAM, Faster R-CNN, YOLO, and SSD, as well as traditional computer vision techniques such as Haar cascades and HOG+SVM. These models work by extracting features from the input images and then using these features to classify and localize objects of interest within the scene. The choice of model will depend on factors such as the complexity of the scene, the desired level of accuracy, and the computational resources available. By leveraging these object detection models, the position detector 224 can accurately track the position of players and the ball 126 throughout the course of a tennis match.

Figure 3A:
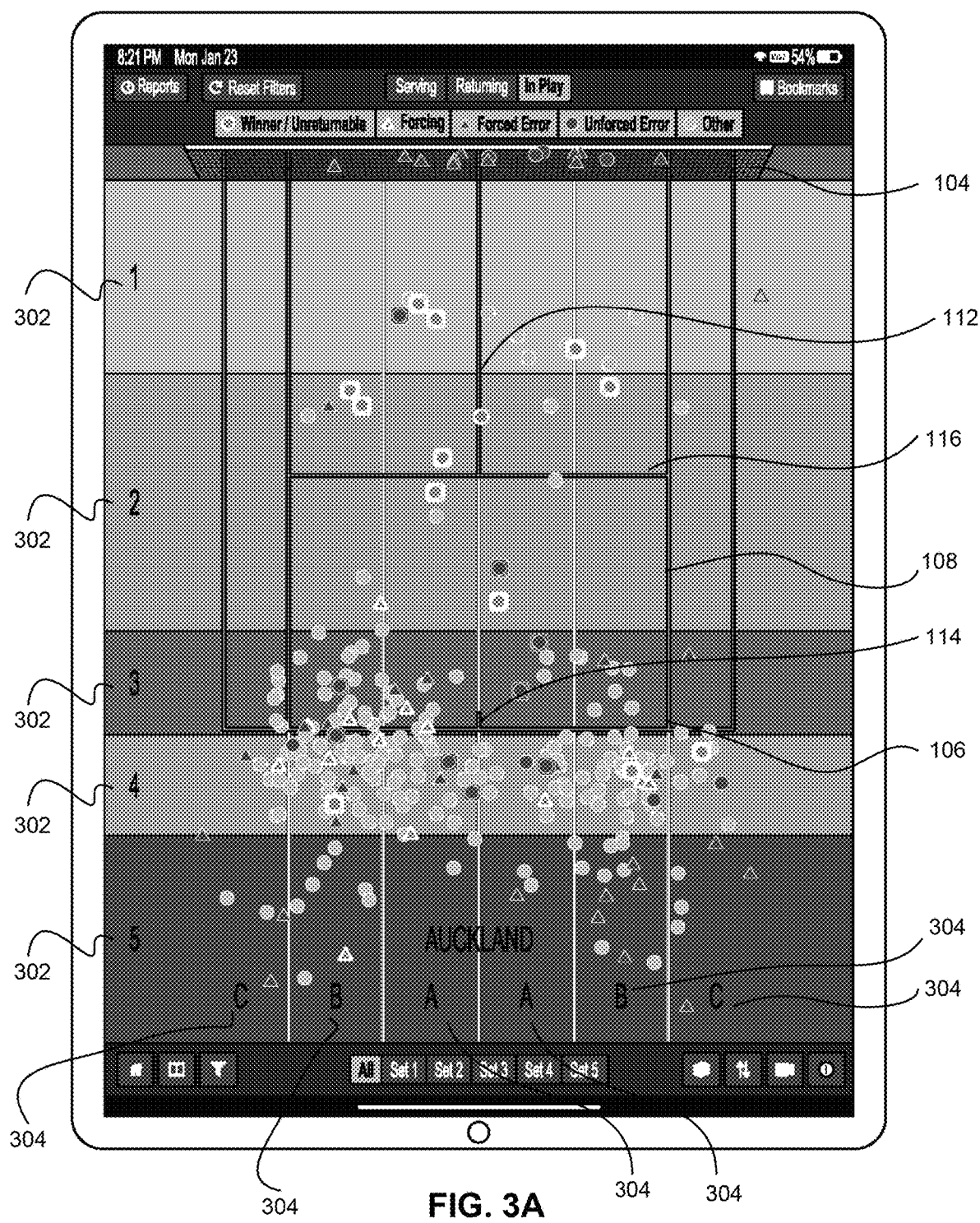
FIG. 3A shows a graphical user interface displaying a portion of the tennis court in accordance with an illustrative embodiment.
Figure 3B:
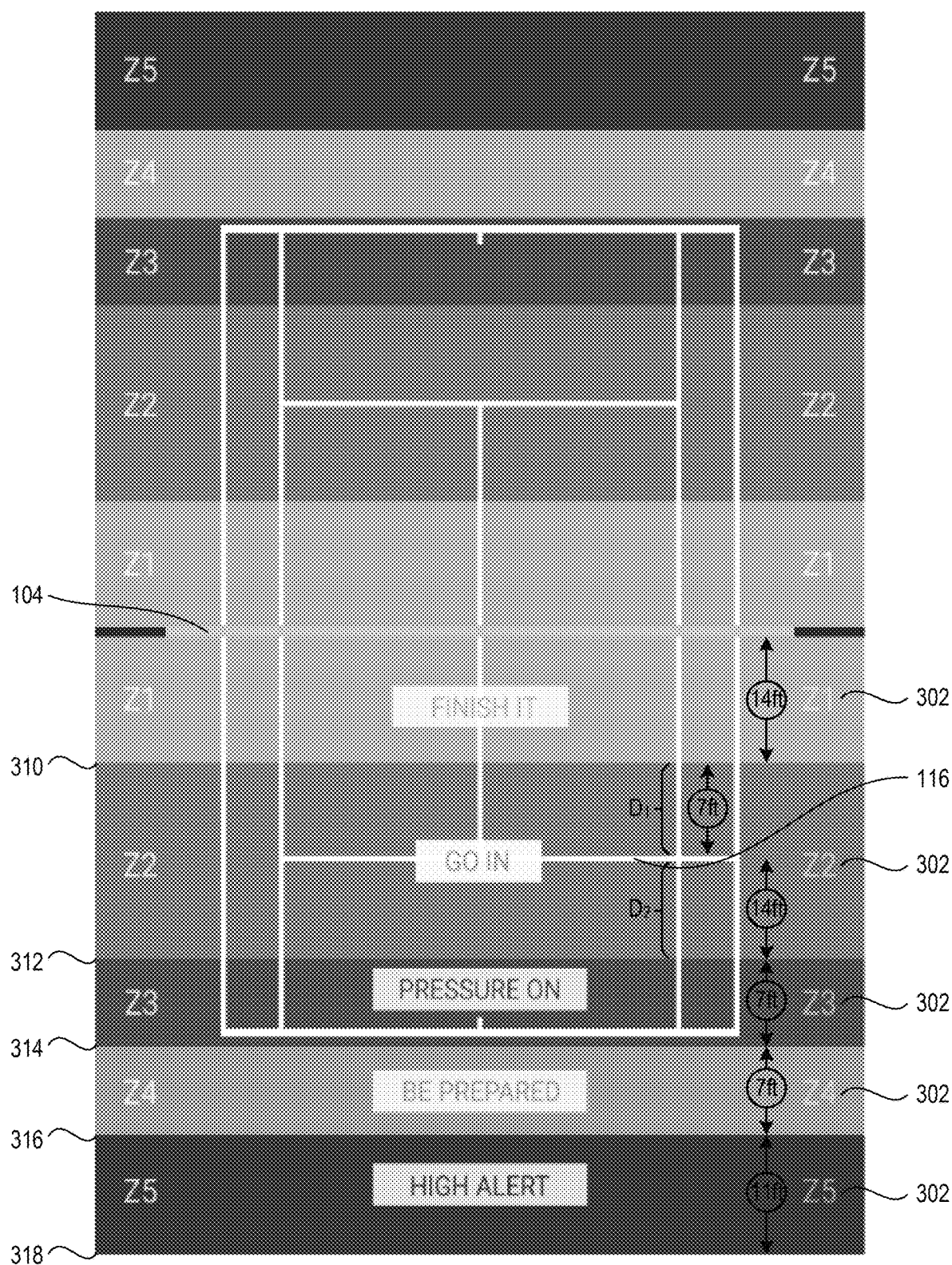
FIG. 3B shows a graphical user interface displaying zones and their respective distances on a portion of the tennis court in accordance with an illustrative embodiment.

FIG. 3A shows a graphical user interface displaying a portion of the tennis court 100. The tennis court 100 is divided into a number of zones 302 and runways 304. Particularly, as shown in FIG. 3B, the tennis court 100 is divided into five zones 302. Each of the five zones 302 corresponds to a pre-determined distance from at least one landmark of the tennis court 100.

As shown in FIG. 3B, the zones 302 are arranged horizontally on the tennis court 100. A first zone (Z1) 302, corresponding to the "finish it" zone, extends from the net 104 of the tennis court 100 to a first line 310. The first zone (Z1) 302 represents an area where players aim to finish the rally with a winner. The first line 310 can be at or about a distance of 14 feet from the net 104. The second zone (Z2) 302, corresponding to the "go in" zone, begins from the first line 310 of the first zone (Z1) 302 and extends to a second line 312. The second zone (Z2) 302 represents an area where players aim to move closer to the net 104 to maintain an aggressive position. The second line 312 can be at or about a total distance of 21 feet from the first line 310 and at or about a distance of 14 feet from the service line 116. The third zone (Z3) 302, corresponding to the "pressure on" zone, begins from the second line 312 of the second zone (Z2) 302 and extends to a third line 314. The third zone (Z3) 302 represents an area where players aim to put pressure on their opponents. The third line 314 can be at or about a distance of 7 feet from the second line 312. The fourth zone (Z4) 302, corresponding to the "be prepared" zone, begins from the third line 314 of the third zone (Z3) 302 and extends to a fourth line 316. The fourth zone (Z4) 302 represents an area where players aim to be prepared for their opponent's shots. The fourth line 316 can be at or about a distance of 7 feet from the third line 314. The fifth zone (Z5) 302, corresponding to the "high alert" zone, begins from the fourth line 316 of the fourth zone 302 and extends to a fifth line 318. The fifth zone (Z5) 302 represents a heightened state of alertness as the player is in a defensive position. The fifth line 318 can be at or about a distance of 11 feet from the fourth line 316. Each of the zones 302 on the tennis court 100 is used to determine a degree of difficulty (or a shot difficulty metric) or, more generally, a shot classification, as will become more apparent throughout the disclosure.

Referring back to FIG. 2, the zone detector 226 of the tennis analytics system 220 can be any script, file, program, application, set of instructions, or computer-executable code that is configured to enable a computing device on which the zone detector 226 is executed to perform one or more functions of the zone detector 226 described herein. The zone detector 226 is configured to determine a zone on the tennis court 100 where a player hits a ball 126. To determine the zone 302 where the player hits the ball 126, the zone detector 226 relies on the player's position. As described above, the player's position is determined by the position detector 224.

To determine where the player hits the ball 126, the zone detector 226 can analyze a plurality of image frames and track the relative positions of the player and the ball 126. The zone detector 226 can use one or more object detection models 225 to track the positions of the ball 126 and the player across each of the plurality of image frames. The zone detector 226 can then determine, based on the respective distances between the pixel coordinates of the ball 126 and the pixel coordinates of the player, an image frame that captures the player hitting the ball 126. The zone detector 226 can determine a timestamp corresponding to the image frame and determine the player position relative to the tennis court by accessing the data structure (for example, Table 1) maintained by the player position detector 224 that stores the player's position over time. In some embodiments, the zone detector 226 can determine the player position by also determining the pixel coordinates of the landmarks on the tennis court 100 and determine the player position by comparing the pixel coordinates of the player relative to the pixel coordinates of the landmarks.

As shown in FIG. 3, the tennis court 100 is not only divided into zones 302, but also into a plurality of runways 304 extending perpendicularly to the zones 302. The first pair of runways 304 extend laterally away from the center service line 112 to a predetermined lateral distance from the center service line 112. In some embodiments, the first pair of runways extend along a center of each service box of the tennis court. The second pair of runways 304 extend from the edges of the first pair of runways 304 to the singles sidelines 108 of the tennis court 100. The third pair of runways 304 extend laterally away from the sidelines 108.

In some embodiments, the zone detector 226 is configured to determine the runway 304 on the tennis court 100 where a player hits a ball 126. To determine the runway 304, the zone detector 226 determines the position of the player and compares the position of the player to the positions of each of the runways 304 to determine which runway 304 the player is in.

In some embodiments, the zone detector 226 is configured to access the data captured by the data capture system 202 and determine the zone or the runway on the tennis court 100 in which the player is positioned. In some embodiments, the zone detector 226 is configured to update the data structure maintained by the position detector 224 to add values corresponding to the zones 302 and runways 304 in which a player hits the ball 126. For example, Table 2 shown below augments the information from Table 1 by adding values corresponding to the zones 302 and runways 304 determined from the player positions.

| Timestamp | Player 1 (P1) Pos. | Player 2 (P2) Pos. | Shot hit by? | Zone | Runway |
| --- | --- | --- | --- | --- | --- |
| 00:00:02 | X1, Y1 | X2, Y2 | P2 | Z4 | A1 |
| 00:00:07 | X3, Y3 | X4, Y4 | P1 | Z2 | A2 |
| 00:00:18 | X5, Y5 | X6, Y6 | P2 | Z2 | B1 |
| ... | ... | ... | ... | ... | ... |
| nn:nn:nn | XN, YN | XN', YN' | P' | Z' | C' |

In some embodiments, an application executing on the client device is configured to present a plurality of graphical user interfaces including a representation of a tennis court with a plurality of vertical lines extending from a net of the tennis court towards a baseline of the tennis court, the plurality of vertical lines including a first vertical line extending through the center service line, a second vertical line and a third vertical line extending through a center of a respective service box of the tennis court and a fourth vertical line and a fifth vertical line extending through a respective singles sideline of the tennis court, and wherein the graphical user interface provides an actionable object configured to either display the plurality of vertical lines or restrict the display of the vertical lines.

C. Systems and Methods for Identifying Shot Types Based on Ball Parameters

As described herein, the tennis analytics system 220 can identify shot types based on the parameters of the ball. For example, by determining various ball parameters, the tennis analytics system can determine various shot types based on the speed, trajectory, and a landing spot of the ball.

Referring back to FIG. 2, the ball parameter detector 228 of the tennis analytics system 220 can be any script, file, program, application, set of instructions, or computer-executable code that is configured to enable a computing device on which the ball parameter detector 228 is executed to perform one or more functions of the ball parameter detector 228 described herein. The ball parameter detector 228 is configured to determine one or more ball parameters. The ball parameters may include, but are not limited to, the trajectory, speed, estimated height above the net, and other characteristics of the ball 126. The trajectory can include the distance the ball has traveled and the direction the ball has traveled.

To determine the ball parameters, the ball parameter detector 228 can analyze a plurality of image frames corresponding to the positions of a player and a ball 126. The ball parameter detector 228 can use one or more object detection models 225 to identify pixel coordinates on the image frame that correspond to the ball 126 and the player. The ball parameter detector 228 can then determine, based on the respective distances between the pixel coordinates of the ball 126 and the pixel coordinates of the player, an image frame in which the ball 126 and the player are the closest. For example, if the distance between the ball 126 and the player in a particular image frame is below a certain threshold, such as 5 to 10 inches, the ball parameter detector 228 can determine that the ball 126 and the player are at their closest proximity in that image frame. This can be done through the use of a minimum function or by comparing the distances to a predefined minimum threshold. In some embodiments, the ball parameter detector 228 can determine a timestamp corresponding to the image frame and then determine the ball position relative to the tennis court 100 by accessing the data structure (for example, Table 1) that stores the positions of the ball 126 over time. In some embodiments, the ball parameter detector 228 can determine the ball position by also determining the pixel coordinates of landmarks on the tennis court 100 and then determining the ball position by comparing the pixel coordinates of the ball 126 relative to the pixel coordinates of the landmarks on the tennis court 100.

Once the ball positions are determined, the ball parameter detector 228 can track the position of the ball 126 from one frame to the next to determine the ball trajectory. The positions of the ball 126 in consecutive frames are then linked to form a continuous path, which corresponds to the trajectory of the ball 126. In some embodiments, once the trajectory of the ball 126 is determined, the ball parameters, such as speed, spin, estimated heights, or other characteristics of the ball 126, can be determined for at least one point along the trajectory of the ball 126. For example, to determine the speed of the ball 126, the ball parameter detector 228 is configured to calculate the displacement of the ball 126 between consecutive frames and divide it by the time intervals between the frames. The time interval between the frames can be determined using the timestamp associated with each frame. Similarly, to determine the height of the ball 126 above the net 104, the position of the ball 126 and the position of the net 104 is determined in each image frame, and the vertical distance is calculated as the difference between the vertical positions of the ball 126 and the net 104. These are just a few examples of the types of ball parameters that the ball parameter detector 228 can determine.

In some embodiments, ball parameters can be tracked using sensors of a ball and player tracking system. The ball parameter detector 228 can access the ball parameters via a communication interface with the ball and player tracking system. In some embodiments, the ball parameters can be obtained via an API or via a data file accessed from the ball and player tracking system. The ball parameters can include timestamps and other data including the identity of the player who hit the ball, the position of the ball relative to the court, among others. Examples of data sources can be data captured by and processed by SONY HAWK-EYE.

In some embodiments, the ball parameter detector 228 can update the data structure maintained by the position detector 224 to track the movement of the ball 126 on the tennis court 100 during the course of a tennis match. Each time an image frame is analyzed, the ball parameter detector 228 adds an entry to the data structure that corresponds to the movement of the ball 126. This allows the data structure to continuously track the ball parameters. For example, Table 3 shown below augments the information from Table 2 by adding values corresponding to the ball parameters determined from the positions of the players and the ball 126.

| Timestamp | Player 1 (P1) Pos. | Player 2 (P2) Pos. | Shot hit by? | Zone | Runway | Ball Parameters |
|---|---|---|---|---|---|---|
| 00:00:02 | X1, Y1 | X2, Y2 | P2 | Z4 | A1 | BP1 |
| 00:00:07 | X3, Y3 | X4, Y4 | P1 | Z2 | A2 | BP2 |
| 00:00:18 | X5, Y5 | X6, Y6 | P2 | Z2 | B1 | BP3 |
| ... | ... | ... | ... | ... | ... | ... |
| nn:nn:nn | XN, YN | XN', YN', | P' | Z' | C' | BP' |

As previously discussed, the zone detector 226 recognizes five zones 302, numbered 1 to 5, on each side of the net 104 on the tennis court 100. Each zone offers unique tactical advantages based on the player's location and the shot difficulty metric associated with a shot. For example, a player in zone 5 is likely to be in defensive or counterattack mode. A player in zone 4 has a strong chance of controlling the point, either by outrallying the opponent or by initiating an offensive shot. When a player moves into zone 3, the player is likely to receive an easier ball 126 from the opponent, leading to an attacking mode. In zone 2, the ball 126 will be even easier, prompting the player to deliver a challenging shot. Finally, in zone 1, the player is in the ideal position to make a finishing shot and end the point.

Referring back to FIG. 2, the mode detector 230 of the tennis analytics system 220 can be any script, file, program, application, set of instructions, or computer-executable code that is configured to enable a computing device on which the mode detector 230 is executed to perform one or more functions of the mode detector 230 described herein. The mode detector 230 is configured to determine the shot difficulty metric associated with a shot. The shot difficulty metric can be any value or indicator that indicates a degree of difficulty associated with a shot. The degree of difficulty of an incoming ball (i.e. a shot hit by the opponent to a player) can be classified in at least one of five different categories, ranging from very easy, to easy, to neutral, to difficult, and to very difficult. Each of these categories can correspond to a set of rules that take a variety of data into account. For instance, the position of the player relative to where the ball lands, the speed of the ball, the trajectory of the ball, the spin of the ball, among others.

In some embodiments, the mode detector 230 is configured to analyze the mode of shots during a tennis match based on the positions of the players, the zones 302 the players are in, and various ball parameters such as trajectory, speed, spin, and the like. For example, the mode detector 230 can evaluate factors such as the speed of the ball 126, the position of the players relative to the ball, the distance between the player and the ball 126, and other contextual information. By analyzing these factors, the mode detector can determine the shot difficulty metric associated with the ball to be hit.

In some embodiments, the mode detector 230 can utilize machine learning models trained to determine the mode of a shot using prior examples. For example, during a training phase, the input data and labels are used to train the models. The input data includes various features related to player positions, zones 302, and ball parameters, while the label includes the difficulty level of the shots. The model is trained using labeled data from historical tennis matches, player statistics, and shot outcomes. Once trained, the models can predict the difficulty level of new shots based on the patterns and relationships it has learned from the labeled training data. The mode detector calculates a value based on the aforementioned factors, including ball parameters, player positioning in a specific zone, and other contextual data. This value, which can be expressed as a numerical score or percentage, is used to classify the shot difficulty metric of a particular shot. Using one or more trained machine learning models or predefined rules, the mode detector 230 assigns a classification that reflects the shot difficulty metric associated with a shot.

Depending on the degree of difficulty of a shot hit to a player, a player is supposed to hit a shot in accordance with a mode of play. For instance, if the incoming shot is very difficult, the player is expected to operate in defend mode. If the incoming shot is difficult, the player is expected to operate in counterattack mode. If the incoming shot is neutral, the player is expected to operate in rally mode. If the incoming shot is easy, the player is expected to operate in challenge mode, and if the incoming shot is very easy, the player is expected to operate in attack mode. If a player makes an error while operating in defend or counterattack mode, the system can classify the error as a forced error. However, if the player makes an error while operating in rally, challenge, or attack mode, the system can classify the error as a unforced error.

Accordingly, the mode detector 230 can be configured to classify the incoming ball into one of the 5 various modes or degrees of difficulty (based on a shot difficulty metric) as described above.

D. Systems and Methods for Determining Both Forced and Unforced Errors Using Machine Learning The tennis analytics system 220 is configured to determine both forced and unforced errors in a tennis match, providing valuable insights into a player's performance. Distinguishing forced errors from unforced errors can provide additional insights that a player can use to improve performance. Utilizing the capabilities of the shot classification detector 232, as described below, the tennis analytics system 220 analyzes shot classifications such as a forcing shot, a forced error or an unforced error. These classifications consider various factors, including ball trajectory, speed, spin, player positioning, and other contextual information. As described herein, one of the challenges existing technological solutions face is their inability to classify if a shot is a forced error or an unforced error or if the shot another player hit is a forcing shot (that forced an error). This is because forced errors require an understanding of the context of the point including the ball parameters of the shot previously hit and the position of both players at the time the player this the shot that resulted in the forced error. It will be appreciated that the present disclosure provides systems and methods for tracking the ball parameters and player positions (including relative to various zones of the tennis court) to determine whether a shot is a forced or unforced error.

E. Systems and Methods for Automatically Tagging Shots Using Computer Vision and Machine Learning The shot classification detector 232 of the tennis analytics system 220 can be any script, file, program, application, set of instructions, or computer-executable code that is configured to enable a computing device on which the shot classification detector 232 is executed to perform one or more functions of the shot classification detector 232 described herein. The shot classification detector 232 is configured to classify shots into various categories, such as unforced error, forced error, forcing, winner/returnable, and other, and to save these classifications as tags.

Continuing with the discussion on the tennis analytics system's capability for tagging shots using computer vision and machine learning, the tennis analytics system can identify various shot types such as unforced errors, forced errors, forcing shots, winner/returnable shots, and others. The tennis analytics system 220 is configured to assign appropriate tags to each shot, providing valuable tools for players, coaches, and analysts. These tags allow them to select and visualize different aspects of the game.

In some embodiments, the shot classification detector 232 can access the data structure (for example, Table 3) corresponding to the positions of the players, the zones 302, and the ball parameters. As previously explained, using one or more trained machine learning models or predefined rules, the shot classification detector 232 can analyze various patterns in the data regarding a player's tactical objectives, such as maintaining the rally, initiating an attacking shot, or going for a winner, to determine shot classifications. For example, if a player is in Zone 4 and executes a shot that lands outside the tennis court 100, the shot classification detector 232 can analyze the data to determine if this shot was an unforced error or a forced error. Specifically, if the incoming ball hit to the player was difficult or very difficult as determined by the mode detector 230, the shot classification detector 232 can classify this shot as a forced error. On the other hand, if the incoming ball hit to the player was very easy, easy or neutral as determined by the mode detector 230, the shot classification detector 232 can classify this shot as an unforced error.

Because the tennis analytics system 220 is configured to analyze each shot and point from both players' perspectives, if the player causes his opponent to make a forced error, the shot classification detector 232 can tag the player's shot as a forcing shot. The shot classification detector 232 can rely on the mode detector 230 for determining the degree of difficulty of the player's shot to his opponent and that information can be used by the shot classification detector 232 to determine whether or not to tag the player's shot as a forcing shot. If the opponent is unable to return the ball in play but makes contact with the ball (resulting in an error), then the shot is classified as an unreturnable shot. If the opponent is unable to even hit the ball, the shot is classified as a winner. In some embodiments, the shot classification detector may classify all shots resulting in winning the point as a winner/unreturnable shot.

Figure 5:
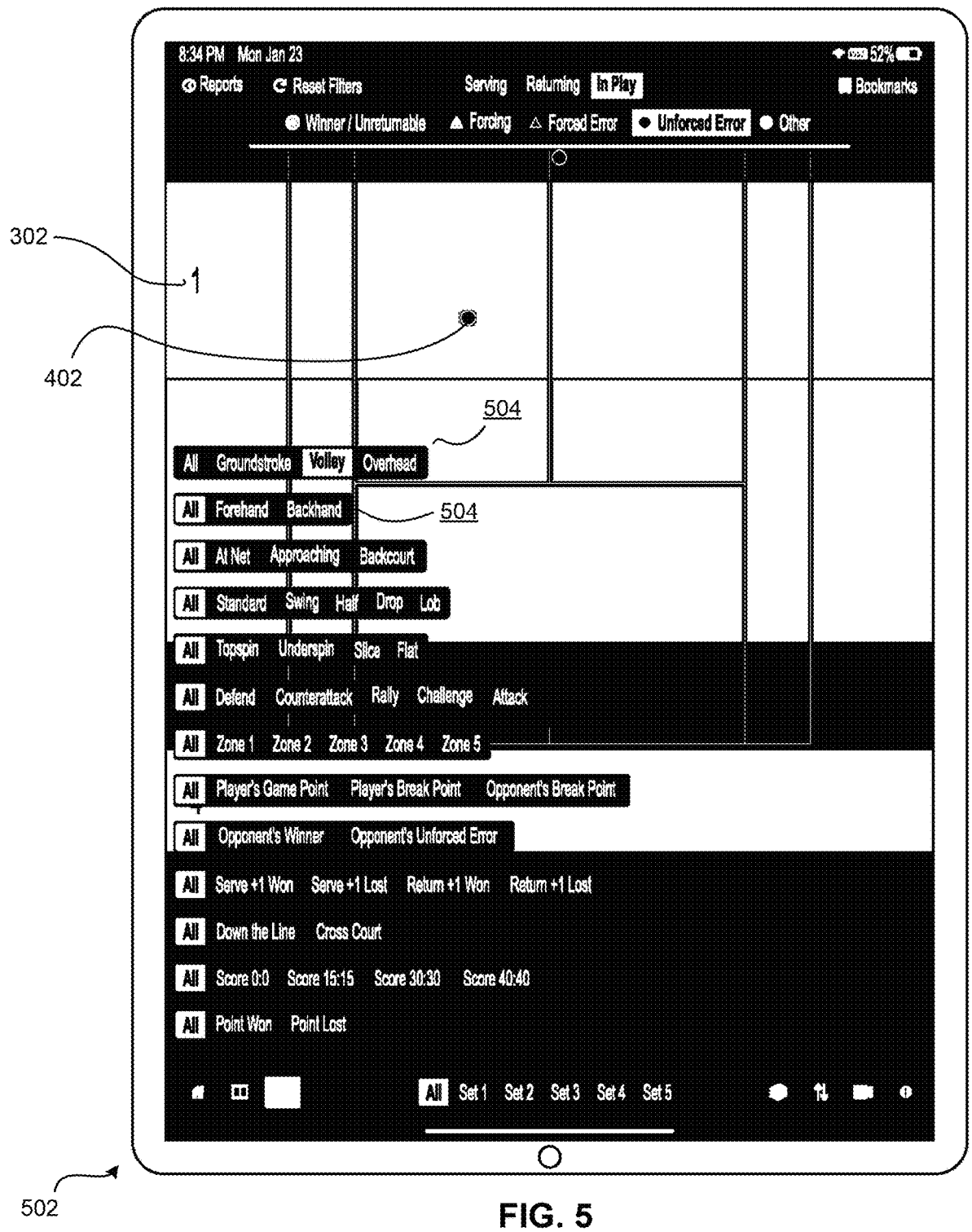
FIG. 5 depicts a graphical user interface with selectable objects for specific shot classification in accordance with an illustrative embodiment.

In some embodiments, as shown in FIG. 5, the shot classification detector 232 can be configured to generate a list that provides a comprehensive representation of various shot families and their corresponding classifications. The list can be structured in multiple rows, with each row representing a specific aspect of the shot.

For example, the list may include the following rows:
1. Shot type: This row represents general classifications of shots, such as groundstrokes, volleys, and overheads.
2. Stroke side: This row represents the side of a player's body used to execute the shot, such as forehand or backhand.
3. Court position: This row represents the locations on the tennis court from which the shot is played, such as at net, approaching, or in the backcourt.
4. Spin type: This row describes the type of spin applied to the shot, including topspin, underspin, slice, or flat.
5. Tactical intention: This row characterizes the strategic intent behind the shot, such as defense, counterattack, rally, challenge, or attack. This can be determined based on the degree of difficulty computed by the mode detector 230.

The list of aspects provided here is not exhaustive, and there may be additional aspects or variations that can be included to further refine the classification process.

F. Systems and Methods for Analyzing a Point Based on Zone/Shot Type/Mode Combination Using Computer Vision The tennis analytics system 220 can analyze points based on zone, shot type, and mode (shot difficulty metric) combination, providing valuable insights into a player's performance on a tennis court 100. Moreover, the tennis analytics system 220 can analyze factors such as ball trajectory, speed, spin, player positioning, and shot classification.

As described above, the tennis analytics system can classify each shot hit by each player during a point using a variety of tags. Examples of tags include a zone tag indicating a zone from which the player hit the shot, a mode tag indicating a degree of difficulty of the incoming ball, a winner or error tag indicating if the shot resulted in a winner or error (for example, winner/unreturnable, forcing shot, forced error, or unforced error), and one or more shot type tags as described above. Using these tags and others, the tennis analytics system can determine whether the player's shot was appropriate given the context of the point (i.e., the shot hit by the opponent). By being able to analyze each shot hit by a player based on this context, the tennis analytics system 220 can analyze each point to determine if the player missed opportunities to be more aggressive on certain shots during the rally or was too aggressive given the difficulty of an incoming shot hit by the opponent. These insights on a per shot and per point basis can then be used by the player to analyze their match performance and adjust their decision making skills over time.

G. Systems and Methods for Identifying Player Weaknesses Based on Zone/Shot Type Combination As previously discussed, the zone detector 226 recognizes different zones on the tennis court 100, each offering unique advantages and difficulties associated with shots. By analyzing a player's performance in specific zones and considering the type of shots executed, the tennis analytics system 220 can pinpoint areas where a player may have weaknesses. By examining patterns, trends, and performance data, including shot classifications, ball trajectory, speed, spin, and player positioning, the tennis analytics system 220 can provide a comprehensive assessment of a player's strengths and weaknesses in different zones and shot types. This information enables players, coaches, and analysts to develop targeted training strategies.

The tennis analytics system can be configured to evaluate a player's match record generated by the tennis analytics system to gain a better understanding of a person's strength and weaknesses. Unlike existing technological solutions that may only provide feedback on winners versus errors on the forehand or backhand side, the tennis analytics system 220 is configured to be able to provide statistical data on a much more granular level based on zones, modes, and other factors such that the tennis analytics system can more granularly pinpoint a player's weaknesses. It is important to consider both the zone and the mode for each mistake a player makes so that the tennis analytics system can develop a training plan corresponding to the zone and mode of the incoming ball.

Referring back to FIG. 2, the presentation engine 234 of the tennis analytics system 220 can be any script, file, program, application, set of instructions, or computer-executable code that is configured to enable a computing device on which the presentation engine 234 is executed to perform one or more functions of the presentation engine 234 described herein. The presentation engine 234 is configured to display a visual representation of a tennis match.

In some embodiments, the presentation engine 234 or the tennis analytics system 220 can be configured to communicate with one or more client devices 260 to cause the presentation of one or more graphical user interfaces, including the graphical user interface described herein. For instance, the presentation engine 234 can be configured to generate graphical user interfaces, that may be transmitted to the one or more client devices 260, and presented on displays of the one or more client devices 260. In some embodiments, the client device 260 may execute an application 285 configured to communicate with the tennis analytics system 220 or execute a web browser or other application configured to communicate with the tennis analytics system 220. Certain features of the graphical user interfaces may be available via the application 285 executing on the one or more client devices 260 without necessarily receiving additional data from the presentation engine 234 of the tennis analytics system 220. Certain functionality of the presentation engine 234 described herein can be performed by the application 285. In particular, when indicating that the presentation engine 234 can present or display graphical user interfaced, it should be appreciated that this can be interpreted to mean that the presentation engine 234 either causes the application 285 executing on the client device to present the graphical user interface or it could mean that the application 285 is configured to present the graphical user interface.

The presentation engine 234 can be configured to display a plurality of graphical user interfaces. However, it should be noted that the display of graphical user interfaces can also be performed by the application 285 executing on a client device 260. The graphical user interfaces can be interactive such that a user can perform a variety of actions that will cause the presentation engine to update the content presented via the graphical user interface. The presentation engine 234 can be configured to access all of the points of a tennis match and provide a visual representation corresponding to each or a subset of the points on a graphical user interface that includes a graphical representation of a tennis court 100 or a portion of a tennis court 100. For instance, the tennis court 100 can be displayed with a plurality of zones, as described herein.

Figure 4:
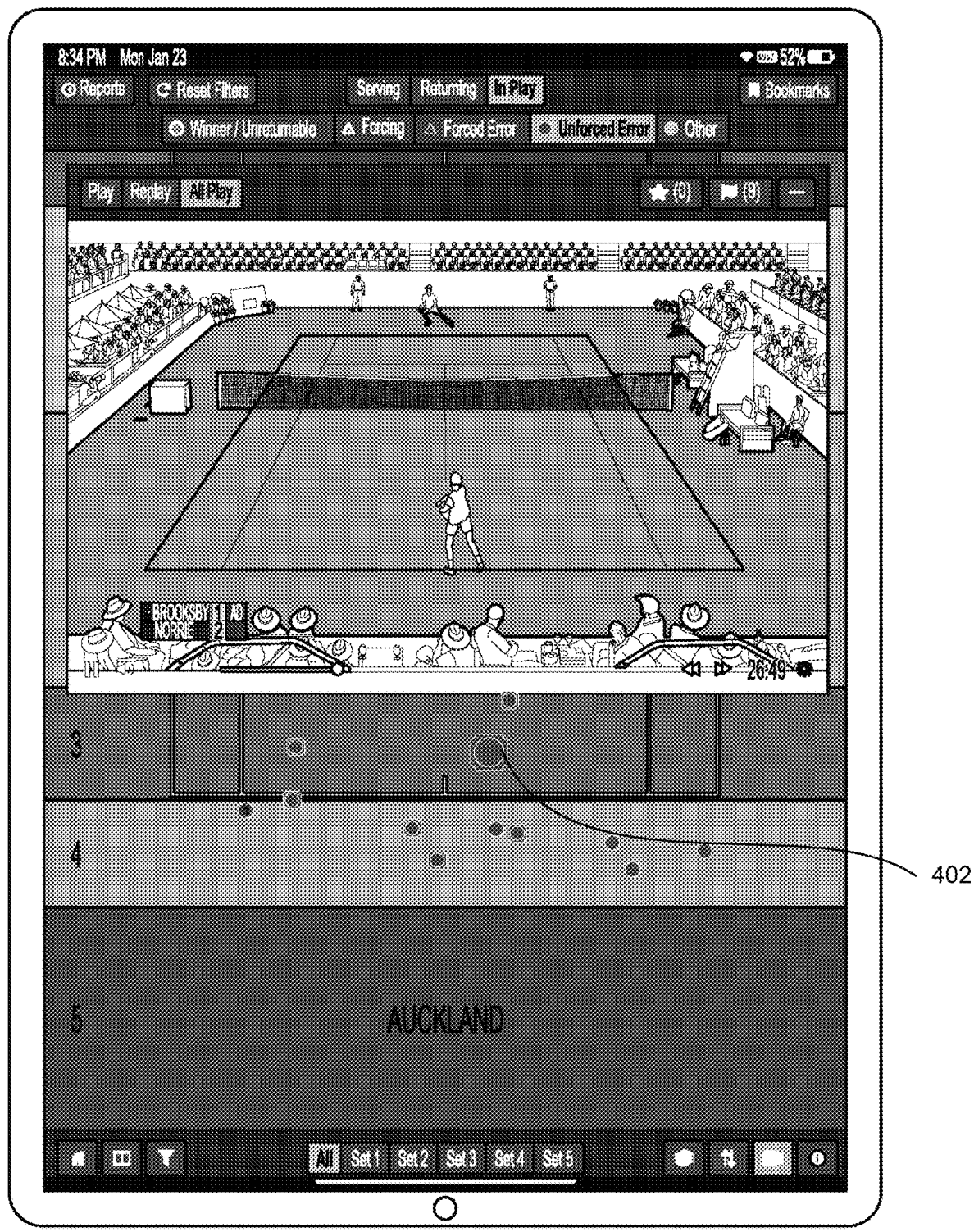
FIG. 4 shows a graphical user interface displaying an image captured from a tennis match in a video player and a graphical representation of a tennis court in accordance with an illustrative embodiment.

FIG. 4 shows a graphical user interface displaying an image captured from a tennis match in a video player and a graphical representation of a tennis court. As seen, the graphical user interface shown in FIG. 4 can include an indicator 402 that is configured to access the tennis match at any point in time. The application 285 can be configured to cause the client device 260 to display various aspects of the tennis match, such as player positions and shot classifications. In some embodiments, the presentation engine 234 can cause a graphical user interface to display the tennis match at different stages of the game, including serving, returning, or in play.

H. Systems and Methods for Categorizing and Presenting Video snippets of Points Based on Zone/Shot Type Combination As discussed below, the tennis analytics system 220 can be configured to present video snippets based on zone and shot type combinations or based on other tags. For example, the presentation engine 234 or the application 285 can be configured to provide a user-friendly interface to gain deeper insights into the data.

Referring now to FIG. 5, which shows a graphical user interface 502 with a plurality of selectable objects 504 corresponding to various shot families. The selectable objects 504 encompass various aspects of a tennis match, including shot classification, different shot modes, ball parameters, zones, scores, and points won or lost, among others. In some embodiments, the presentation engine 234 can access the data structure that contains various details about the tennis match, such as player's position on the tennis court 100, shot classifications, ball parameters, etc. Moreover, the presentation engine 234 can be configured to display this information on the graphical user interface 502.

The effective filtering of shots is important for a comprehensive analysis of a tennis match. For instance, the graphical user interface 502 can display a plurality of selectable objects 504 representing different shot families. In some embodiments, the presentation engine 234 can be configured to allow users of the client device 260 to view only the information that is relevant to a user. Specifically, the presentation engine 234 or the application 285 can cause the graphical user interface 502 to selectively filter the information being displayed, allowing the user to view only the information that is relevant to the user's interests. For example, the user may choose to view only information about a particular shot classification or only information about a particular ball parameter rather than being presented with all the information in the data structure at once. To achieve this filtering capability, the presentation engine 234 is configured to access the data structure, where all the information about the tennis match is stored. Then, the presentation engine 234 sorts the information based on the user's interest and filters out the irrelevant information. The filtered information is then displayed on the graphical user interface 502.

As shown in FIG. 4, the graphical user interface includes a plurality of indicators 402. Each indicator 402 can be linked to a particular video snippet such that when a user interacts with a particular indicator 402, the corresponding video snippet is selected and displayed within a video player displayed within the graphical user interface.

The presentation engine 234 is configured to store an association between each indicator and a corresponding video snippet. To do so, the presentation engine uses the data structure described herein that maintains information about each point of a tennis match. The tennis analytics system can maintain, in the data structure, information about each shot of a point, including a shot number assigned to the shot based on the sequence of shots hit during the point, a timestamp associated with each shot, and parameters corresponding to each shot, including one or more tags assigned to the shot by the shot classification detector. In particular, the tennis analytics system is able to determine the timestamp of each shot based on a video recording or data recording it receives to analyze the tennis match. As such, the timestamp of each shot corresponds to a timestamp of the video recording or data recording at which point the shot was hit.

Accordingly, the presentation engine 234 can be configured to select a video snippet corresponding to a shot based on a timestamp associated with the shot. To do so, the presentation engine can generate a video snippet by determining a timestamp of the shot. In some embodiments, the video snippet can start a predetermined amount of time before the timestamp of the shot or at the timestamp corresponding to the previous shot (to allow a user to observe the beginning of the shot through the end of the shot). The length of the video snippet may be determined based on a timestamp of a subsequent shot. If the shot is the last shot of the point, the length of the video snippet may be based on a predetermined threshold, for instance, 2-7 seconds.

In this way, the presentation engine 234 can maintain, for each shot, or each point, a corresponding video snippet that shows the player hitting the shot or the point corresponding to the shot. The presentation engine can maintain a video library of the video recording and can select the video snippet from the video library based on the timestamp associated with the shot that corresponds with the indicator presented on the graphical user interface.

I. Systems and Methods for Goal Setting

The tennis analytics system 220 is configured to provide valuable insights into player performance to evaluate shot effectiveness and identify strengths and areas for improvement. For example, as discussed below, the presentation engine 234 or the application 285 can be configured to present a diamond visualization on a graphical user interface including a portion of a tennis court. The diamond visualization represents ball landing spots during the in-play stage. By adjusting the diamond's size based on player skill level, players can determine what percentage of their shots land within the diamond and what percentage of shots land outside the diamond. Players may aim to hit a certain percentage of shots outside the diamond as hitting shots that land outside the diamond typically indicate a good shot relative to a shot that lands in the diamond. Additionally, the presentation engine 234 or the application 285 can be configured to overlay a rectangle within the serving box, visually representing areas where serves should or should not land. Analyzing shot classifications within and outside the rectangle enables players to assess their serve performance and make necessary adjustments. This level of display allows players to align their goals with their on-court performance.

In some embodiments, the presentation engine 234 or the application 285 can be configured to display a graphical user interface of a tennis court with a diamond 602 overlaid on the tennis court 100 to enable a user to visually see which shots landed inside the diamond 602 and which shots landed outside the diamond 602. Shots landing inside the diamond 602 may represent shots that do not challenge the opponent relative to shots landing outside the diamond 602. In this way, users can work on improving their play by increasing the number of shots they hit that land outside the region defined by the diamond 602.

Figure 6A:
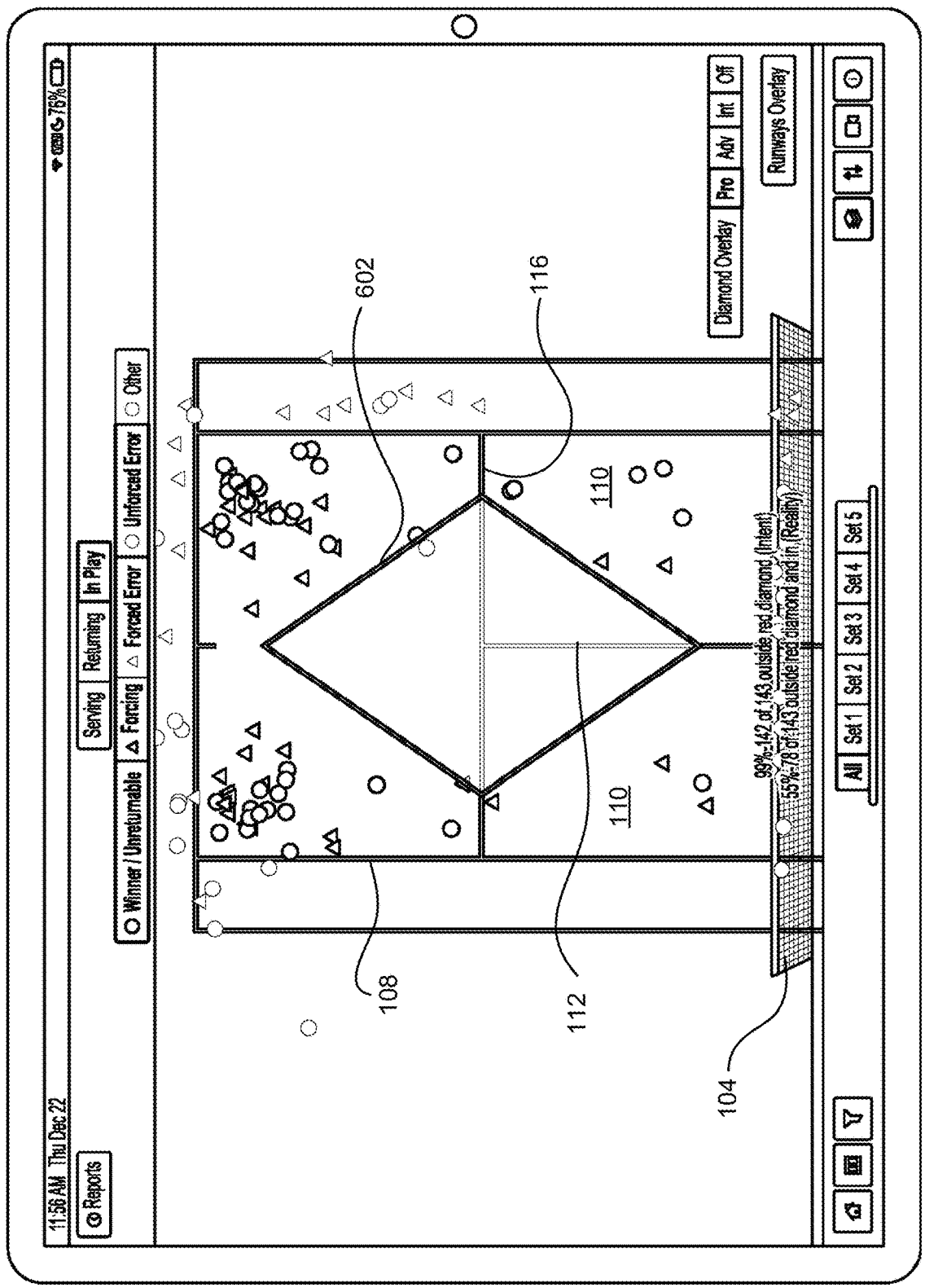
FIGS. 6A and 6B each depicts a diamond on a graphical representation of a tennis court in accordance with an illustrative embodiment.
Figure 6B:
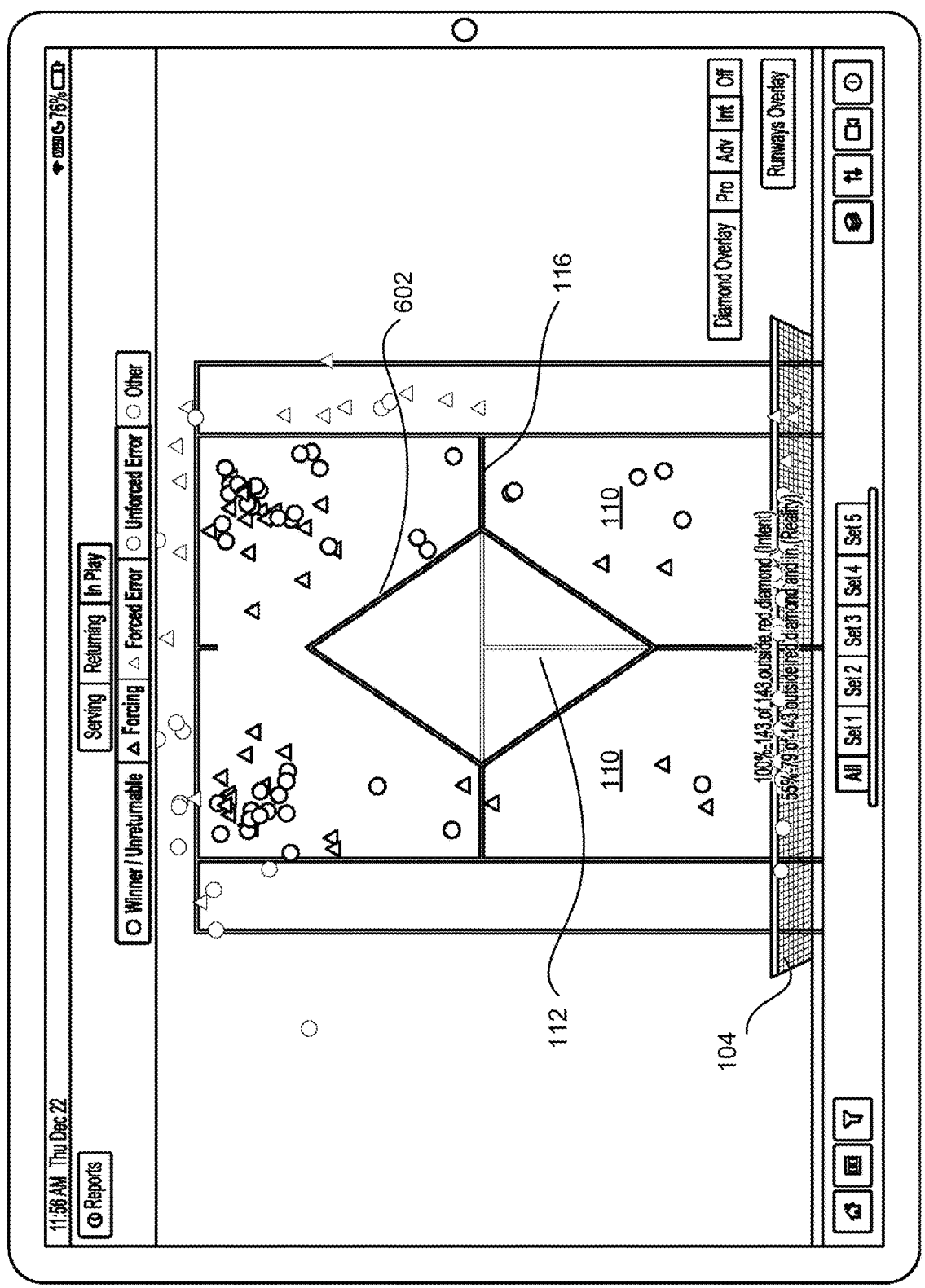

In some embodiments, the presentation engine 234 or the application 285 can be configured to adjust the size of the diamond 602 based on a player's skill level. For example, as shown in FIG. 6A, the size of the diamond 602 is larger for a professional player relative to the size of the diamond 602 for intermediate players. In the same manner, for intermediate players, as depicted in FIG. 6B, the size of the diamond 602 is smaller as an intermediate player does not have the same level of skill as a professional player and, therefore, has a larger area on the tennis court 100 outside of the diamond 602 in which to try to land their shot. The presentation engine 234 or the application 285 can be configured to display or cause the display of a distribution of shot classifications, such as winner/unreturnable, forcing, forced error, unforced error, and others, both inside and outside the diamond 602, to help evaluate a player's shot effectiveness in various zones and runways of the tennis court 100.

Figure 7A:
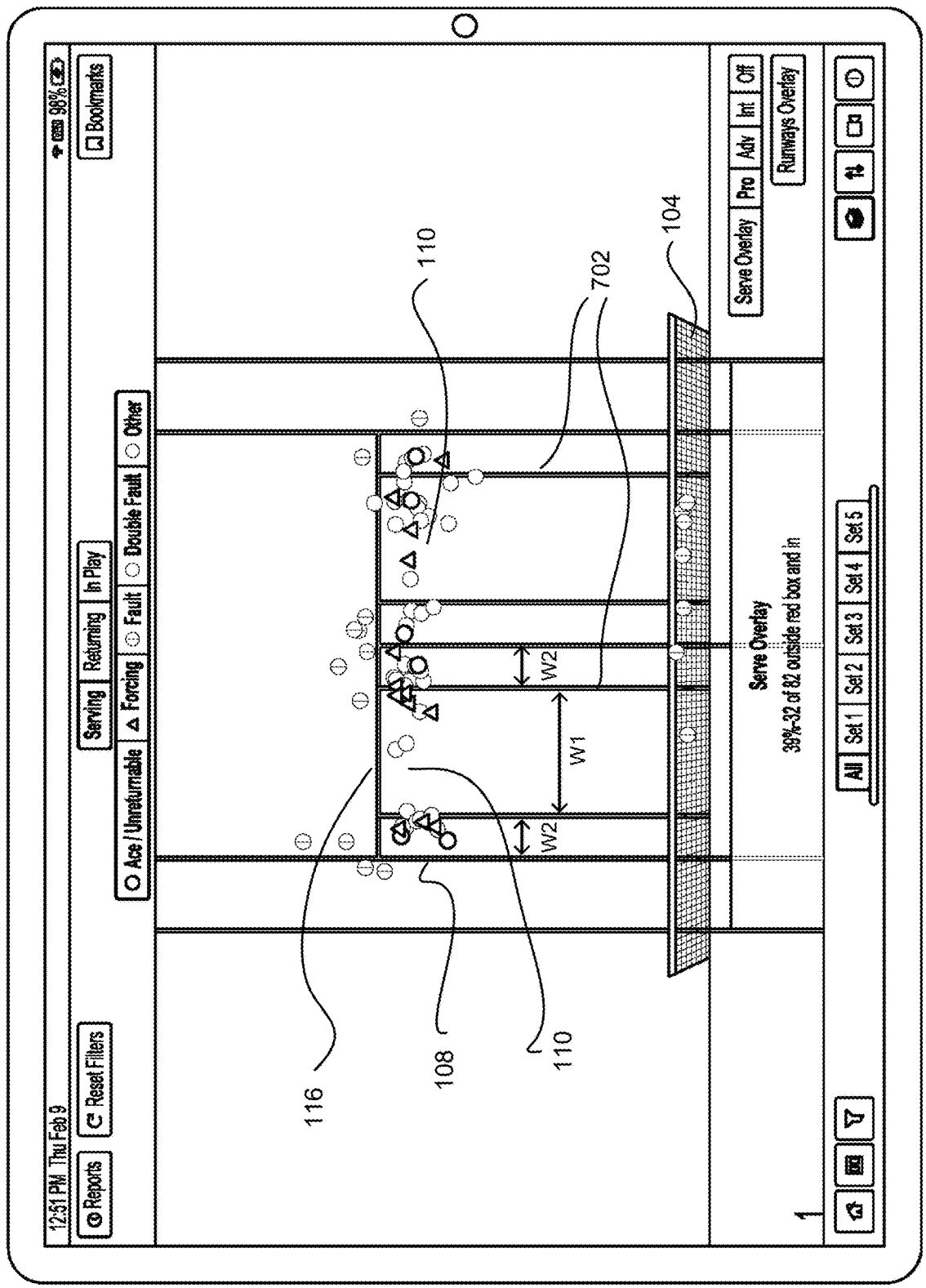
FIGS. 7A and 7B each depicts a rectangle on a graphical representation of a tennis court in accordance with an illustrative embodiment.
Figure 7B:
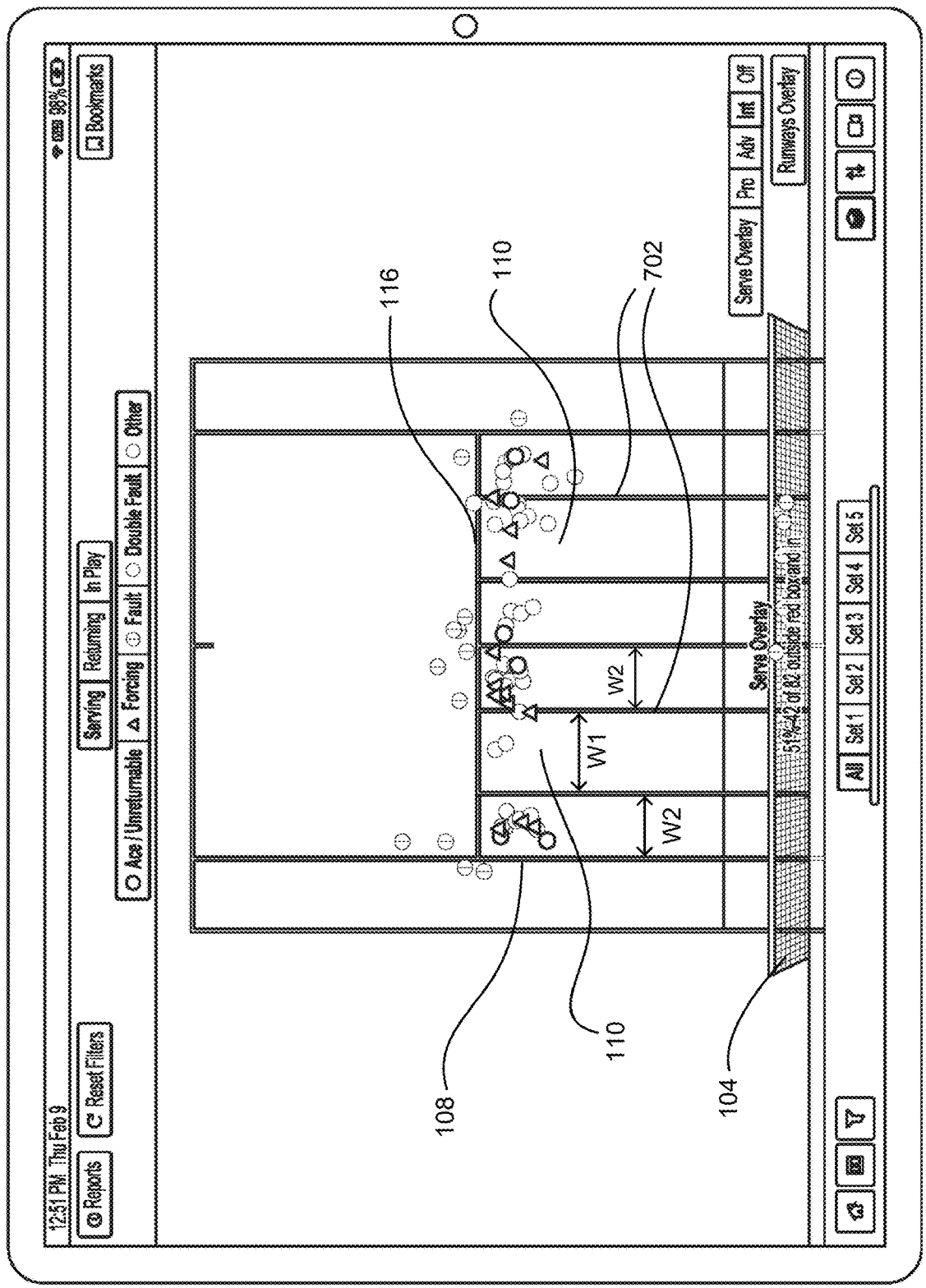

Referring now to FIGS. 7A-7B, the presentation engine is configured to provide an overlay (such as a rectangle 702) on each serving box 110. The rectangle 702 extends from the net 104 to the service line 116 and is positioned parallel to the sideline 108. As depicted, the rectangle 702 effectively divides each serving box 110 into two distinct regions. The region located within the rectangle is referred to as width W1, while the region between the rectangle 702 and the sideline 108 is referred to as width W2.

In some embodiments, the presentation engine 234 or the application 285 can be configured to visually display the rectangle 702 on a tennis court 100 to represent the landing spots for a player's serves. Generally, players aim to hit serves that land in the outside regions W2, making it more challenging for their opponents to return the serve effectively. By providing a visual representation of the number of serves landing both inside and outside the rectangle 702, the presentation engine (for instance, via the application 285) enables players to assess their serve performance and identify areas for improvement.

In some embodiments, the presentation engine 234 or the application 285 can allow a player to select a width of the rectangle 702 from a plurality of candidate widths based on a player's skill level. For example, as shown in FIGS. 7A-7B, the width of the rectangle 702 differs between a professional player and an intermediate player. Particularly, the width W1 of the rectangle 702 for a professional player is greater than the width W1' of the rectangle 702 for an intermediate player.

The distinction in width serves a technical purpose. The increased width W1 of rectangle 702 for professional players allows them to target more precise areas in the outside regions W2, thereby making it more challenging for their opponents to effectively return the serve. Conversely, the narrower width W1' of rectangle 702 for intermediate players acknowledges their current skill level and acts as a visual indicator of the slightly reduced precision in their serve placements, particularly in targeting the difficult ball landing spots within the outside regions W2. By enabling players to adjust the width of the rectangles 702, the presentation engine 234 or the application 285 can provide a visual indication of the varying levels of difficulty.

The presentation engine 234 can also be configured to display a plurality of actionable objects representing professional, advanced, or intermediate levels, among others, via the graphical user interface 502. Moreover, the presentation engine 234 can be configured to display the distribution of shot classifications for each skill level. For instance, as explained above, the presentation engine 234 can be configured to display the distribution of shot classifications, such as winner/unreturnable, forcing, forced error, unforced error, and others, both within and outside the rectangle 702 to help evaluate a player's shot effectiveness in various zones 302 and runways 304 of the tennis court 100.

J. Systems and Methods for Scouting Opponents

By utilizing visual representations, data filtering, and shot analysis, the tennis analytics system 220 is configured to enhance a player's preparation and decision-making abilities, enabling them to develop effective strategies and make informed tactical decisions when facing specific opponents. The tennis analytics system 220 can be configured to analyze matches of a plurality of players. For any given singles match, the tennis analytics system 220 can be configured to analyze a match from the perspective of both players. In this way, the tennis analytics system 220 can maintain a history of matches for each player whose match has been analyzed. The tennis analytics system 220 can be configured to aggregate match performance data for each match of each player to generate a profile for each player. By maintaining match performance profiles for each player including the strengths and weaknesses of each player, the tennis analytics system 220 can be configured to provide recommendations and insights about certain players' weaknesses to a user of the system. These insights may be based on the user's own strengths and weaknesses.

K. Systems and Methods for Generating a Highlight Reel for a Player Based on Zone/Shot Type Combination As explained above, the tennis analytics system 220 is configured to categorize and present video snippets of points based on zones and shot types. This allows players to efficiently navigate through match footage and focus on specific areas of interest. In particular, as described herein, the tennis analytics system 220 can identify, for each zone, shot difficulty metric, and other tags assigned or associated with each shot of a point, a result of the shot. The tennis analytics system 220 can further determine, from the result of the shot and the corresponding tags, which shot tags result in higher than normal errors and which shot tags result in higher than normal winners or forcing shots. The tennis analytics system 220 can identify each shot of a match corresponding to those higher than normal errors to create a highlight reel of such shots such that a player can view the highlight reel and notice that a particular shot is causing the player to make errors. For instance, if the player tends to have a higher number of errors when hitting backhand down the line shots from zone 4 because the number of errors resulting from this shot exceeded a threshold number of shots, the tennis analytics system 220 can generate a highlight reel with this insight and present it to the user to indicate that backhand down the line shots from zone 4 is the player's weakness and improvement is needed. Conversely, if the player tends to have a higher number of errors when hitting forehand crosscourt shots from zone 2 because the number of winners resulting from this shot exceeded a threshold number of shots, the tennis analytics system 220 can generate a highlight reel with this insight and present it to the user to indicate that forehand crosscourt shots from zone 2 is the player's strength and the player should try to put themselves in a position to hit more of these shots in a match.

Figure 8:
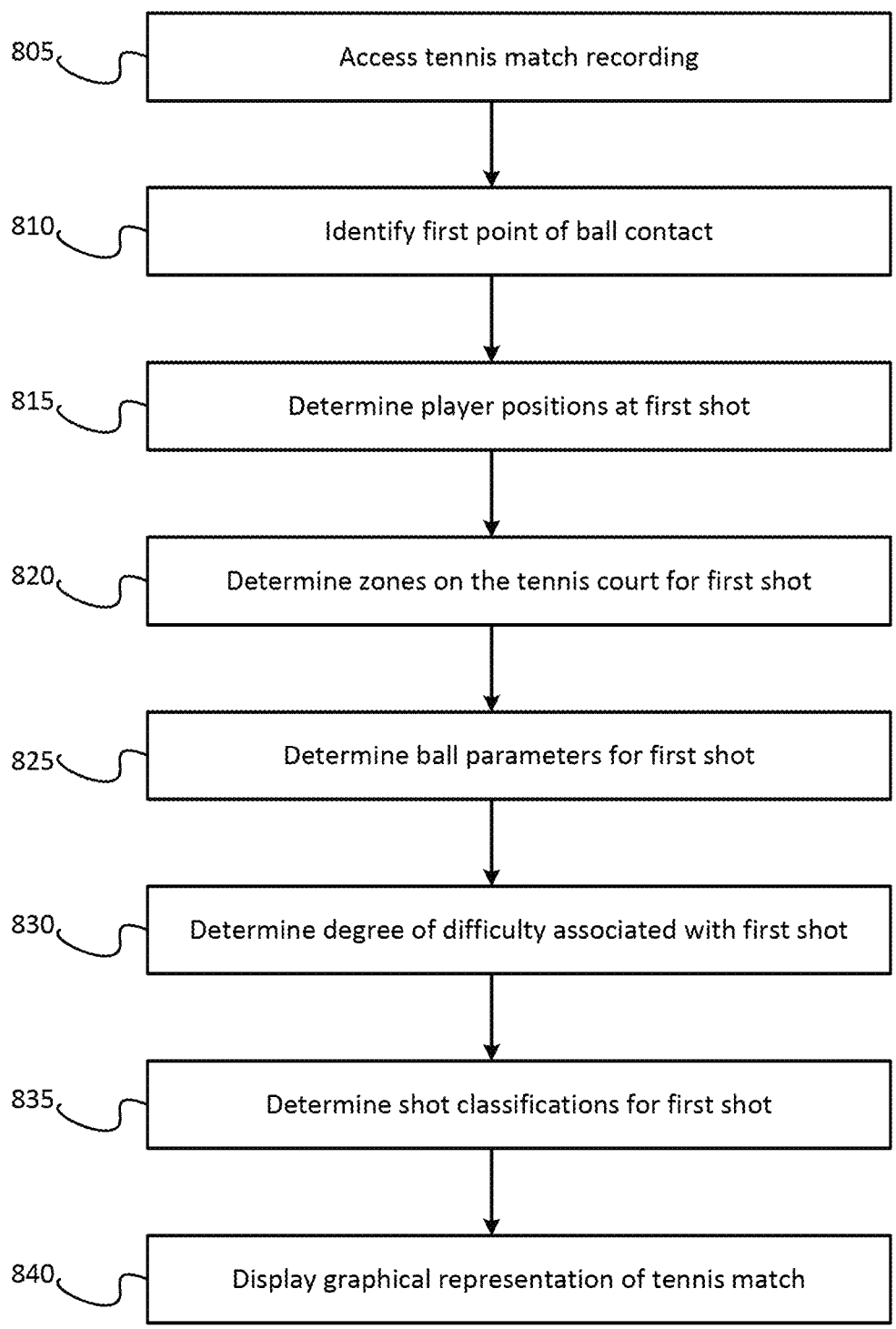
FIG. 8 depicts a flow diagram of an example method of capturing and displaying data related to a tennis match in accordance with an illustrative embodiment.

Referring now to FIG. 8, depicted is a flow diagram of a method 800 of capturing and displaying tennis match data. The method 800 may be implemented or performed using any of the components described herein in conjunction with FIGS. 1-7B above or FIG. 9 below. In overview, a computing device may access a recording of the tennis match (805). The computing device may identify a first point of ball contact (810). The computing device may determine the positions of each player when each player hits a first shot (815). The computing device may determine the zones on a tennis court for the respective first shots (820). The computing device may determine ball parameters for the respective first shots (825). The computing device may determine the shot difficulty metric associated with a shot (830). The computing device may determine shot classifications for the respective first shots (835). The computing device may cause a client device to display a graphical representation of the tennis match (840).

In further detail, a computing device (e.g., tennis analytics system 220) may access a recording of the tennis match (805). The recording of the tennis match can be done through a data capture system 202, such as cameras, sensors, or other data collection methods. The recording serves as the primary data source for analysis and contains all the visual information needed to perform subsequent steps in the method. This comprehensive visual data includes player positions, zones 302, runways 304, ball trajectories, and court landmarks, such as baselines 106, service lines 116, and sidelines 108, among others.

The computing device may process the recording to determine the first point of ball contact (810). This can be achieved using an object detection model 225 that is configured to identify players and balls in the recording. The model can be based on deep learning techniques or traditional computer vision methods. This timestamp marks the beginning of the tennis match and is important for examining player positions and various ball parameters.

The computing device may determine the positions of each player when each player hits a first shot (815). The computing device may use a position detector 224 to determine the players and the ball positions on the tennis court 100 when each player executes their respective first shots. Accurate player positions are essential for understanding zones 302, runways 304, and shot dynamics within the tennis match.

The computing device may determine the zones 302 on the tennis court 100 for the respective first shots (820). The computing device may further analyze the identified player positions through the zone detector 226 and classify them into specific zones 302 and runways 304. These zones 302 and runways 304 provide context for the type of shot played and the player's strategic intentions.

The computing device may determine ball parameters for the respective first shots (825). The computing device may use a ball parameter detector 228 or another suitable model to examine various ball-related factors for each player's shot, such as speed, trajectory, spin, and the like. These ball parameters offer insights into the technical execution of the shot. By analyzing ball parameters, the computing device can help players understand the quality of the shots played during a tennis match.

The computing device may determine the shot difficulty metric associated with a shot (830). The computing device may use a mode detector 230 to analyze shot modes during the tennis match based on the positions of the players, the zones the players are in, and various ball parameters such as trajectory, speed, spin, and the like. By accessing the shot difficulty metric, the computing device may identify the level of challenge a player faces during a tennis match.

The computing device may determine shot classifications for the respective first shots (835). Based on the analyzed data, the computing device may classify each first shot through a shot classification detector 232 using predefined categories. These categories may include shot type (e.g., groundstroke, volley), stroke side (e.g., forehand, backhand), court position (e.g., at the net, backcourt), spin type (e.g., topspin, slice), and tactical intention (e.g., defense, attack), among others. These classifications provide a comprehensive understanding of the player's performance.

The computing device may cause a display or a client device to display a graphical representation of the tennis match (840). After processing the data, the computing device may use a presentation engine 234 or an application 285 to cause display of a visual representation of the tennis match, incorporating the various insights gathered from the previous steps. This graphical representation may include visual aids such as zone overlays, trajectory plots, and filtering options, to name a few, that help to better understand the tennis match dynamics. By presenting the information in a granular and easily interpretable format, players can quickly identify trends, patterns, and areas for improvement.

L. Systems and Methods for Facilitating a Universal Language, Situationally Specific Methodology, and Framework for Analyzing, Viewing, and Learning the Modern Game In light of the above, the tennis analytics system 220 can enable different stakeholders, such as players, coaches, analysts, commentators, and fans to develop a shared understanding and communication framework. The tennis analytics system 220, as described herein, can analyze each shot of a match using a standardized tagging system that tags the shot hit by the player based on the shot itself as well as based on the incoming shot by the opponent. The shot is tagged based on where the ball lands, where the player hits the shot, the shot difficulty metric of the incoming shot, as well as the type of shot hit by the player (defensive, rally, counter attack, or aggressive, etc.) as well as the type of shot based on direction, speed, spin, and trajectory (for instance, lob, dropshot, dip drive, etc.). Based on this common tagging framework, each shot of a match that is recorded can be analyzed and stakeholders can evaluate a player's performance using a standardized framework that is visualized using a graphical user interface that divides a tennis court into zones and in some embodiments, runways.

Although the present disclosure uses tennis as an example of a system for analyzing a match, it should be appreciated that aspects of the present disclosure apply equally to other sports as well, for example, badminton, squash, pickleball, racquetball, table tennis, and others. The discussion referring to tennis courts or zones of a tennis court are used as an example, and depending on the sport in which the present disclosure is used for, the court can refer to a badminton court, a squash court, a pickleball court, or a table tennis table, as examples. Similarly, the zones may refer to various regions of the respective type of court or table.

M. Network Environment and Computing Environment

Providing a comprehensive understanding of the operating environment and associated system components is essential in conjunction with the methods and systems explained above. Describing various aspects of the operating environment, including hardware elements and system components, helps establish a context for the implementation and functionality of the aforementioned methods and systems.

Figure 9:
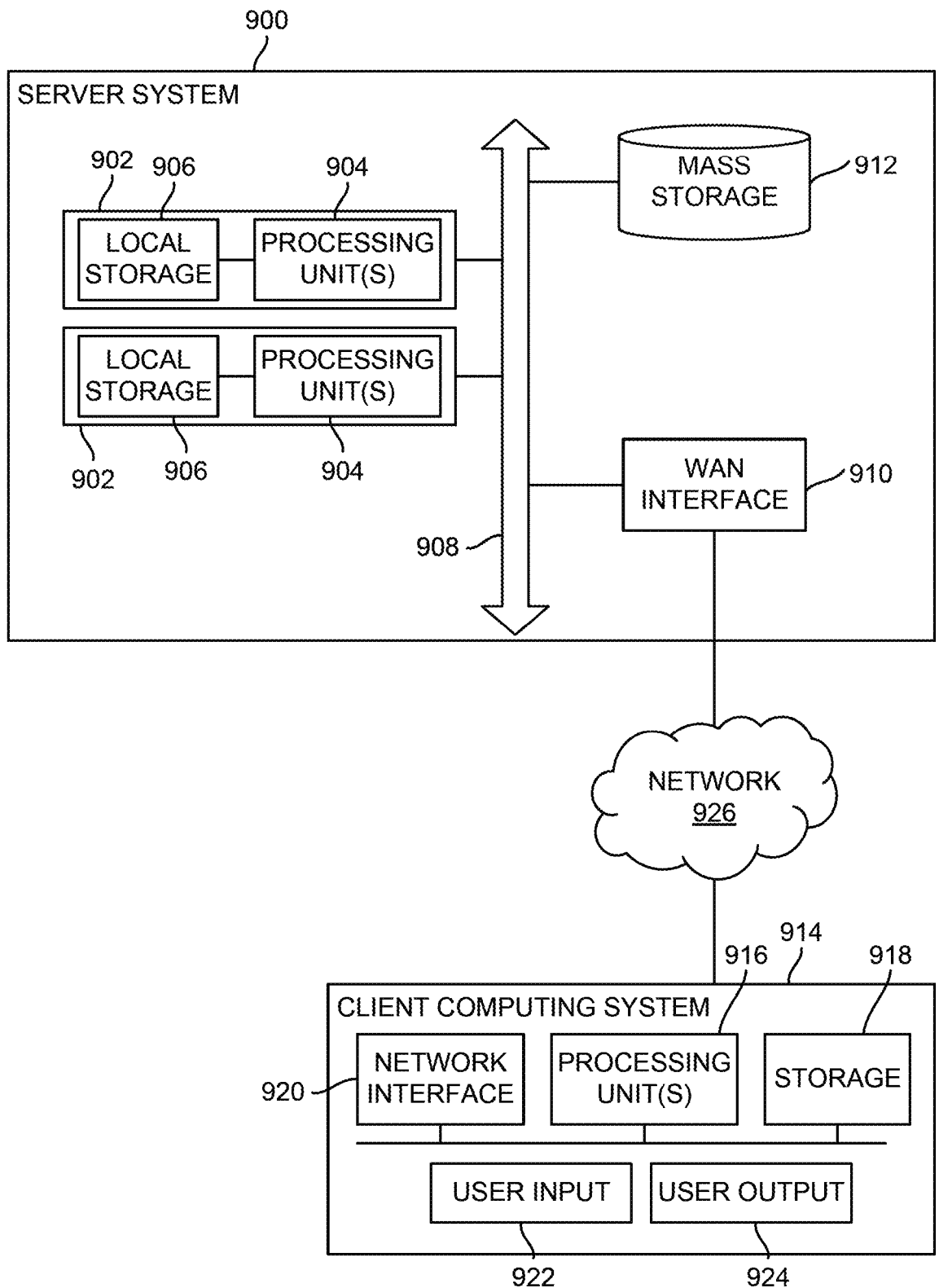
FIG. 9 depicts a block diagram of a server system and a client computer system in accordance with an illustrative embodiment.

In this regard, various operations described herein can be implemented on computer systems. FIG. 9 shows a simplified block diagram of a representative server system 900, client computer system 914, and network 926 usable to implement certain embodiments of the present disclosure. In various embodiments, server system 900 or similar systems can implement services or servers described herein or portions thereof. Client computer system 914 or similar systems can implement clients described herein. The system (e.g., the tennis analytics system 220) and others described herein can be similar to the server system 900.

Server system 900 can have a modular design that incorporates a number of modules 902; while two modules 902 are shown, any number can be provided. Each module 902 can include processing unit(s) 904 and local storage 906.

Processing unit(s) 904 can include a single processor, which can have one or more cores, or multiple processors. In some embodiments, processing unit(s) 904 can include a general-purpose primary processor as well as one or more special-purpose co-processors such as graphics processors, digital signal processors, or the like. In some embodiments, some or all processing units 904 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 904 can execute instructions stored in local storage 906. Any type of processors in any combination can be included in processing unit(s) 904.

Local storage 906 can include volatile storage media (e.g., DRAM, SRAM, SDRAM, or the like) and/or non-volatile storage media (e.g., magnetic or optical disk, flash memory, or the like). Storage media incorporated in local storage 906 can be fixed, removable or upgradeable as desired. Local storage 906 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 904 need at runtime. The ROM can store static data and instructions that are needed by processing unit(s) 904. The permanent storage device can be a non-volatile read-and-write memory device that can store instructions and data even when module 902 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 906 can store one or more software programs to be executed by processing unit(s) 904, such as an operating system and/or programs implementing various server functions such as functions of the tennis analytics system 220 of FIG. 2 or any other system described herein, or any other server(s) associated with the tennis analytics system 220 or any other system described herein.

"Software" refers generally to sequences of instructions that, when executed by processing unit(s) 904 cause server system 900 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 904. Software can be implemented as a single program or a collection of separate programs or program modules that interact as desired. From local storage 906 (or non-local storage described below), processing unit(s) 904 can retrieve program instructions to execute and data to process in order to execute various operations described above.

In some server systems 900, multiple modules 902 can be interconnected via a bus or other interconnect 908, forming a local area network that supports communication between modules 902 and other components of server system 900. Interconnect 908 can be implemented using various technologies including server racks, hubs, routers, etc.

A wide area network (WAN) interface 910 can provide data communication capability between the local area network (interconnect 908) and the network 926, such as the Internet. Technologies can be used, including wired (e.g., Ethernet, IEEE 802.3 standards) and/or wireless technologies (e.g., Wi-Fi, IEEE 802.11 standards).

In some embodiments, local storage 906 is intended to provide working memory for processing unit(s) 904, providing fast access to programs and/or data to be processed while reducing traffic on interconnect 908. Storage for larger quantities of data can be provided on the local area network by one or more mass storage subsystems 912 that can be connected to interconnect 908. Mass storage subsystem 912 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 912. In some embodiments, additional data storage resources may be accessible via WAN interface 910 (potentially with increased latency).

Server system 900 can operate in response to requests received via WAN interface 910. For example, one of modules 902 can implement a supervisory function and assign discrete tasks to other modules 902 in response to received requests. Work allocation techniques can be used. As requests are processed, results can be returned to the requester via WAN interface 910. Such operation can generally be automated. Further, in some embodiments, WAN interface 910 can connect multiple server systems 900 to each other, providing scalable systems capable of managing high volumes of activity. Techniques for managing server systems and server farms (collections of server systems that cooperate) can be used, including dynamic resource allocation and reallocation.

Server system 900 can interact with various user-owned or user-operated devices via a wide-area network such as the Internet. An example of a user-operated device is shown in FIG. 9 as client computing system 914. Client computing system 914 can be implemented, for example, as a consumer device such as a smartphone, other mobile phone, tablet computer, wearable computing device (e.g., smart watch, eyeglasses), desktop computer, laptop computer, and so on.

For example, client computing system 914 can communicate via WAN interface 910. Client computing system 914 can include computer components such as processing unit(s) 916, storage device 918, network interface 920, user input device 922, and user output device 924. Client computing system 914 can be a computing device implemented in a variety of form factors, such as a desktop computer, laptop computer, tablet computer, smartphone, other mobile computing device, wearable computing device, or the like.

Processor 916 and storage device 918 can be similar to processing unit(s) 904 and local storage 906 described above. Suitable devices can be selected based on the demands to be placed on client computing system 914; for example, client computing system 914 can be implemented as a "thin" client with limited processing capability or as a high-powered computing device. Client computing system 914 can be provisioned with program code executable by processing unit(s) 916 to enable various interactions with server system 900 of a message management service such as accessing messages, performing actions on messages, and other interactions described above. Some client computing systems 914 can also interact with a messaging service independently of the message management service.

Network interface 920 can provide a connection to the network 926, such as a wide area network (e.g., the Internet) to which WAN interface 910 of server system 900 is also connected. In various embodiments, network interface 920 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 922 can include any device (or devices) via which a user can provide signals to client computing system 914; client computing system 914 can interpret the signals as indicative of particular user requests or information. In various embodiments, user input device 922 can include any or all of a keyboard, touch pad, touch screen, mouse or other pointing device, scroll wheel, click wheel, dial, button, switch, keypad, microphone, and so on.

User output device 924 can include any device via which client computing system 914 can provide information to a user. For example, user output device 924 can include a display to display images generated by or delivered to client computing system 914. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 924 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 904 and 916 can provide various functionality for server system 900 and client computing system 914, including any of the functionality described herein as being performed by a server or client, or other functionality associated with message management services.

It will be appreciated that server system 900 and client computing system 914 are illustrative and that variations and modifications are possible. Computer systems used in connection with embodiments of the present disclosure can have other capabilities not specifically described here. Further, while server system 900 and client computing system 914 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, numerous modifications are possible. Moreover, embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet 104 download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A system comprising:
   one or more processors coupled to memory, the one or more processors configured to:

access a recording of a tennis match played on a tennis court between a first player and a second player, the recording captured by a data capture system;

determine, using the recording, for a first point of the tennis match,
  i) a first position of the first player at a first time corresponding to when the second player hit a first shot, and
  ii) a second position of the first player at a second time corresponding to when the first player hits a second shot in response to the first shot;

determine, for the first shot, a zone of a plurality of zones of the court based on the second position of the first player, wherein the plurality of zones includes a first zone extending from a net of the tennis court to a first distance of 14 feet from the net, a second zone extending from a first edge of the first zone to a second distance of 35 feet from the net, a third zone extending from a second edge of the second zone to a third distance of 42 feet from the net, a fourth zone extending from a third edge of the third zone to a fourth distance of 49 feet from the net, and a fifth zone extending from a fourth edge of the fourth zone to a fifth distance from the net greater than the fourth distance;

determine, from the recording, a first set of ball parameters responsive to the second player hitting a ball and prior to the ball being hit by the first player;

determine a shot difficulty metric of the first shot based on the zone, the first position, and the first set of ball parameters;

store, in one or more data structures, an association between the shot difficulty metric, the zone, the first position, and the first set of ball parameters;

determine a shot classification of the second shot hit by the first player in response to the first shot, the shot classification determined based on a second set of ball parameters corresponding to the second shot and the shot difficulty metric of the first shot; and responsive to a request for the shot classification, provide, for display on a client device, a graphical user interface including a computer-generated tennis court with the plurality of zones and an indicator indicating the second position of the first player using data stored in the one or more data structures, wherein the indicator includes an actionable object, which when interacted with, causes the client device to present a second graphical user interface including a video player to present a video clip corresponding to the second shot.

2. The system of claim 1, wherein the video player executing on the client device includes a first video object configured to adjust a speed of the video responsive to an interaction with the first video object and a second video object configured to display at least one of a previous frame or a next frame of a sequence of frames of the video clip responsive to interaction with the second video object.

3. The system of claim 1, wherein the indicator includes an actionable object, which when interacted with, causes the one or more processors to present a second graphical user interface including a video player to present a video clip of the first point.

4. The system of claim 1, wherein the one or more processors are further configured to:
  update the one or more data structures to store an association between the first point, the shot classification of the first shot and the shot classification of the second shot; and
  wherein the indicator indicating the second position further corresponding to a result of the first point.

5. The system of claim 1, wherein the recording is a video recording captured by at least one video camera or the recording is a recording of data points captured by one or more sensors.

6. The system of claim 1, wherein an application executing on the client device is configured to present a plurality of graphical user interfaces including a representation of a tennis court with a plurality of vertical lines extending from a net of the tennis court towards a baseline of the tennis court, the plurality of vertical lines including a first vertical line extending through the center service line, a second vertical line and a third vertical line extending through a center of a respective service box of the tennis court and a fourth vertical line and a fifth vertical line extending through a respective singles sideline of the tennis court, and wherein the graphical user interface provides an actionable object configured to either display the plurality of vertical lines or restrict the display of the vertical lines.

7. The system of claim 1 wherein to determine the first position of the first player at the first time corresponding to when the second player hit the first shot, the one or more processors are configured to determine a contact time at which the second player hit the first shot and determine, based on the time, the first position of the first player at the contact time at which the second player hit the first shot.

8. The system of claim 6, wherein the recording is a video recording, and wherein the one or more processors are configured to:
  select a subset of frames of the plurality of frames included in the video recording;
  identify, from a first frame of the subset of frames, the first position of the first player responsive to inputting the first frame through a model trained to detect objects, the first frame corresponding to the contact time at which the second player hit the first shot; and
  identify, from a second frame of the subset of frames, the second position of the first player when the first player hits the second shot by inputting the second frame through the model.

9. The system of claim 1, wherein to determine the zone of the court to which the second position of the first player corresponds, the one or more processors is configured to select the zone from the plurality of zones based on coordinates corresponding to the second position.

10. The system of claim 1, wherein the one or more processors are configured to determine a shot category of the second shot responsive to determining a shot family, a corresponding shot type and spin.

11. The system of claim 10, wherein the one or more processors are configured to generate an analysis report analyzing a plurality of points including the first point based on respective shot categories of shots hit by the first player.

12. The system of claim 1, wherein the second set of ball parameters include a speed of the ball, a trajectory of the ball, an amount of spin, and an estimated height of the ball above the net, wherein the second set of ball parameters are used to determine a shot category of the second shot.

13. The system of claim 1, wherein one or more processors are further configured to:
  determine, using the recording, for a second point of the tennis match subsequent to the first point, i) a third position of the first player at a third time corresponding to when the second player hit a third shot, and ii) a fourth position of the first player at a fourth time corresponding to when the first player hits a fourth shot in response to the third shot;

determine, for the third shot, a respective zone of the plurality of zones of the court based on the fourth position of the first player;

determine, from the recording, a third set of ball parameters responsive to the second player hitting the ball and prior to the ball being hit by the first player in the second point;

determine a second shot difficulty metric of the third shot based on the zone, the third position, and the third set of ball parameters;

store, in one or more data structures, an association between the second shot difficulty metric, the respective zone, the third position, and the third set of ball parameters;

determine a respective shot classification of the fourth shot hit by the first player in response to the third shot, the shot classification determined based on a fourth set of ball parameters corresponding to the fourth shot and the second shot difficulty metric of the third shot; and responsive to a request for the shot classification of the fourth shot, provide, for display, a respective graphical user interface including the computer-generated tennis court with the plurality of zones and a respective indicator indicating the fourth position of the first player using data stored in the one or more data structures.

14. The system of claim 1, wherein the one or more processors are further configured to provide a diamond on the tennis court, wherein an area included in the diamond is a first area based on a first selectable object and the area of the diamond is a second area based on a second selectable object.

15. The system of claim 1, wherein the one or more processors are further configured to provide a rectangle within each service box of the tennis court, wherein a width of the rectangle is a first width based on a first selectable object and the width of the rectangle is a second width based on a second selectable object.

16. The system of claim 1, wherein the indicator is one of a plurality of indicators and wherein the one or more processors are configured to provide a graphical user interface with a plurality of selectable objects, wherein selection of a first subset of the plurality of selectable objects includes presenting a first subset of the plurality of indicators on the tennis court and wherein selection of a second subset of the plurality of selectable objects includes presenting a second subset of the plurality of indicators on the tennis court.

17. The system of claim 16, wherein the one or more processors are configured to generate a report of the second player based on different sequence of events.

18. The system of claim 17, wherein the one or more processors are configured to:
automatically identify strengths and weaknesses and classify them based on different sequence of events; and
cause presentation of graphical user interface displaying performance analysis.

19. The system of claim 18, wherein the graphical user interface presented on the display of the client device includes a runway object, which when actuated causes the client device to modify the graphical user interface to display a plurality of vertical runway lines, each runway line extending vertically from the net to a bottom side of the display, wherein a first runway line extends along a center service line of the tennis court, a pair of second runway lines extend along a center of respective service boxes of the tennis court, and a pair of third runway lines extend along single sidelines of the tennis court.

20. A method comprising:
accessing, by one or more processors, a recording of a tennis match played on a tennis court between a first player and a second player, the recording captured by a data capture system;

determining, by the one or more processors, using the recording, for a first point of the tennis match,
i) a first position of the first player at a first time corresponding to when the second player hit a first shot, and
ii) a second position of the first player at a second time corresponding to when the first player hits a second shot in response to the first shot;

determining, by the one or more processors, for the first shot, a zone of a plurality of zones of the court based on the second position of the first player, wherein the plurality of zones includes a first zone extending from a net of the tennis court to a first distance of 14 feet from the net, a second zone extending from a first edge of the first zone to a second distance of 35 feet from the net, a third zone extending from a second edge of the second zone to a third distance of 42 feet from the net, a fourth zone extending from a third edge of the third zone to a fourth distance of 49 feet from the net, and a fifth zone extending from a fourth edge of the fourth zone to a fifth distance from the net greater than the fourth distance;

determining, by the one or more processors, from the recording, a first set of ball parameters responsive to the second player hitting a ball and prior to the ball being hit by the first player;

determining, by the one or more processors, a shot difficulty metric of the first shot based on the zone, the first position, and the first set of ball parameters;

storing, by the one or more processors, in one or more data structures, an association between the shot difficulty metric, the zone, the first position, and the first set of ball parameters;

determining, by the one or more processors, a shot classification of the second shot hit by the first player in response to the first shot, the shot classification determined based on a second set of ball parameters corresponding to the second shot and the shot difficulty metric of the first shot; and responsive, by the one or more processors, to a request for the shot classification, providing, by the one or more processors, for display on a client device, a graphical user interface including a computer-generated tennis court with the plurality of zones and an indicator indicating the second position of the first player using data stored in the one or more data structures, wherein the indicator includes an actionable object, which when interacted with, causes the client device to present a second graphical user interface including a video player to present a video clip corresponding to the second shot.

\* \* \* \* \*